Feb. 26, 1946. C. T. GALLOWAY 2,395,544
GEAR GRINDING MACHINE
Filed Oct. 20, 1943 15 Sheets-Sheet 1

Inventor
CLARENCE T. GALLOWAY
By
Attorney

Feb. 26, 1946. C. T. GALLOWAY 2,395,544
GEAR GRINDING MACHINE
Filed Oct. 20, 1943 15 Sheets-Sheet 5
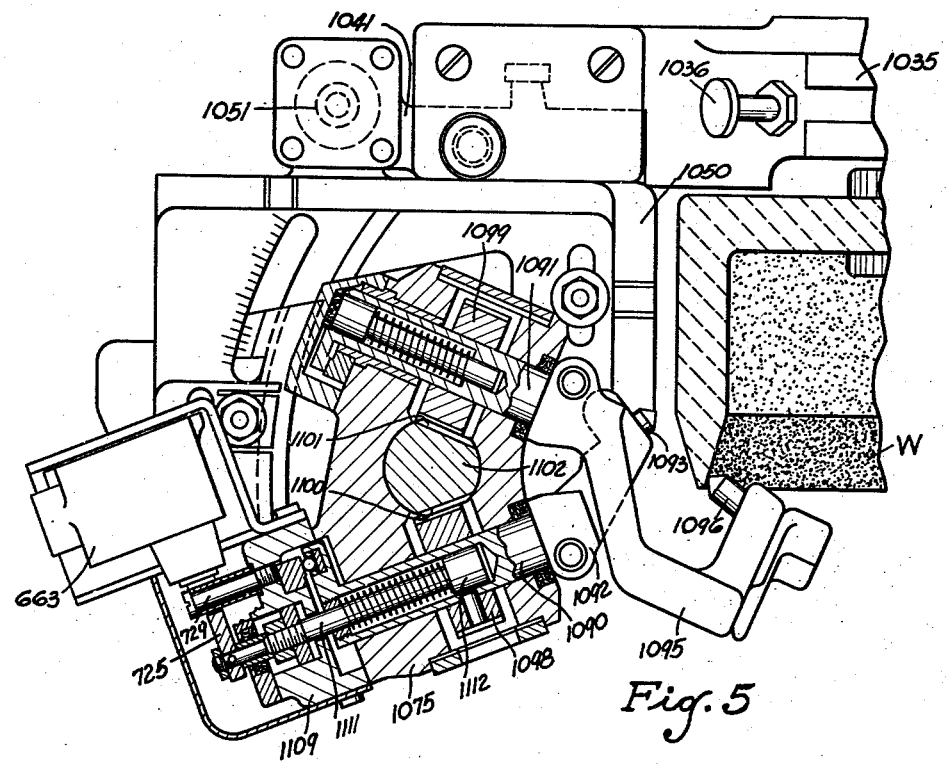
Fig. 5
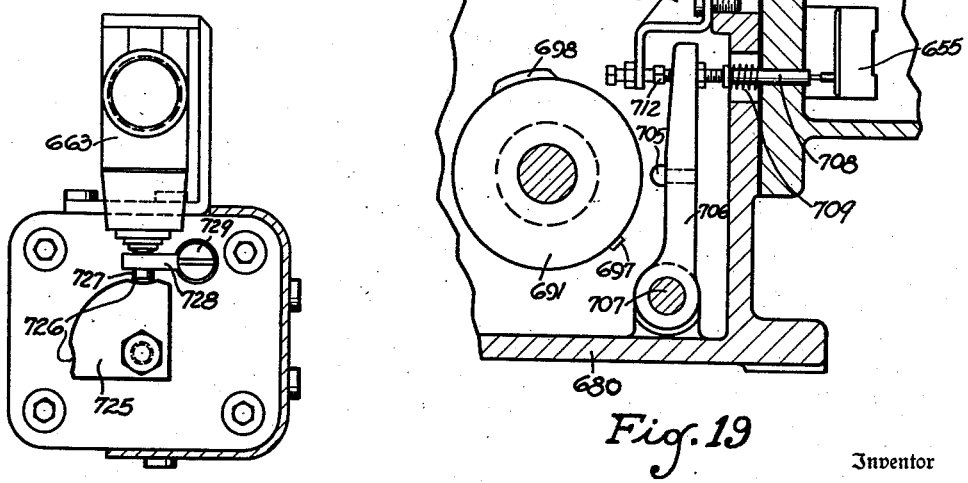
Fig. 6
Fig. 19
Inventor
CLARENCE T. GALLOWAY
By
Attorney Feb. 26, 1946.  C. T. GALLOWAY  2,395,544
GEAR GRINDING MACHINE
Filed Oct. 20, 1943  15 Sheets-Sheet 6

Inventor
CLARENCE T. GALLOWAY
By
Attorney

Inventor
CLARENCE T. GALLOWAY
Attorney

Feb. 26, 1946.    C. T. GALLOWAY    2,395,544
GEAR GRINDING MACHINE
Filed Oct. 20, 1943    15 Sheets-Sheet 9

Inventor
CLARENCE T. GALLOWAY
By
Attorney

Inventor
CLARENCE T. GALLOWAY
By
Attorney

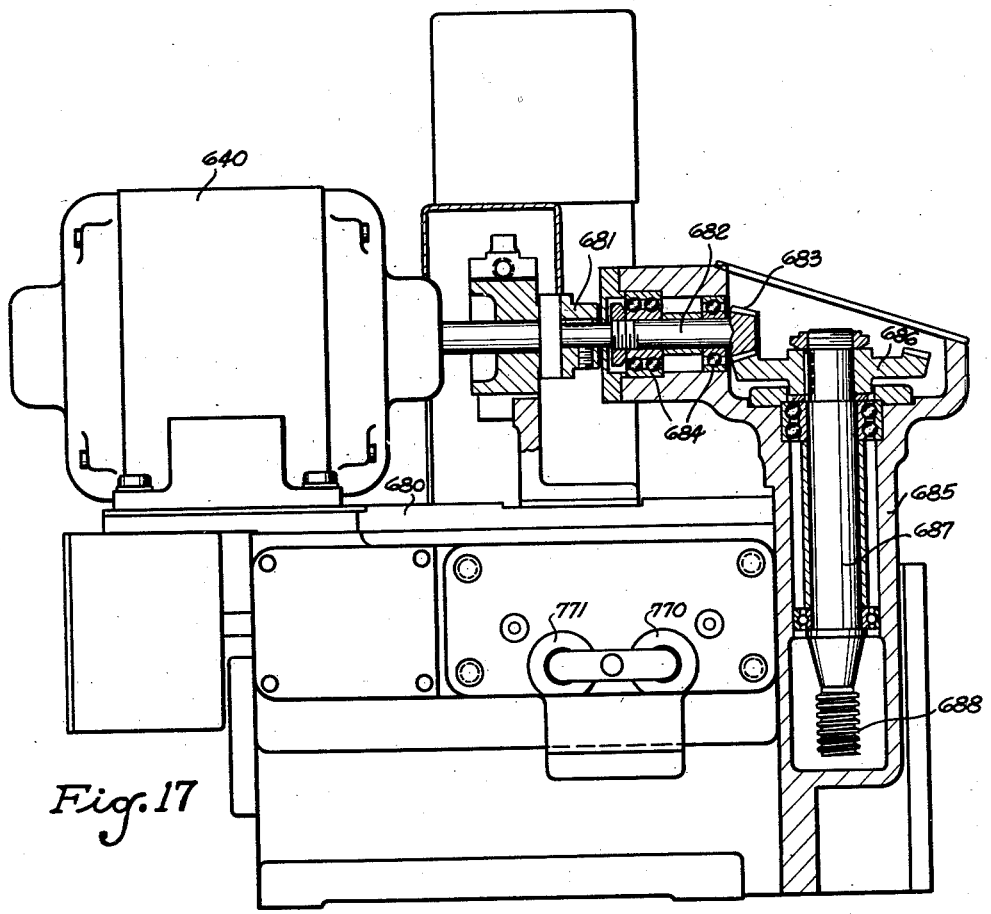
Fig. 17
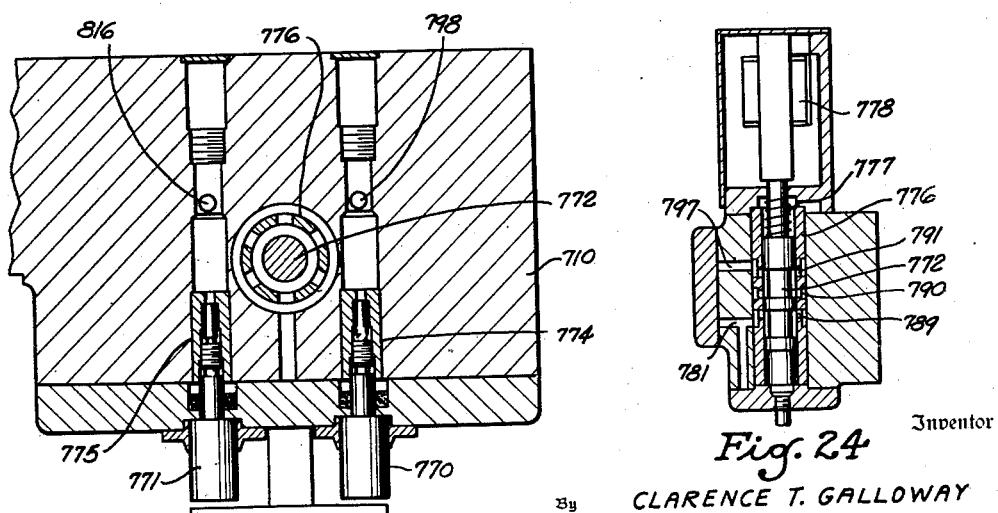
Fig. 20
Fig. 24
Inventor
CLARENCE T. GALLOWAY
By
Attorney Feb. 26, 1946. C. T. GALLOWAY 2,395,544
GEAR GRINDING MACHINE
Filed Oct. 20, 1943 15 Sheets-Sheet 13

Inventor
CLARENCE T. GALLOWAY
By
Schlesinger
Attorney

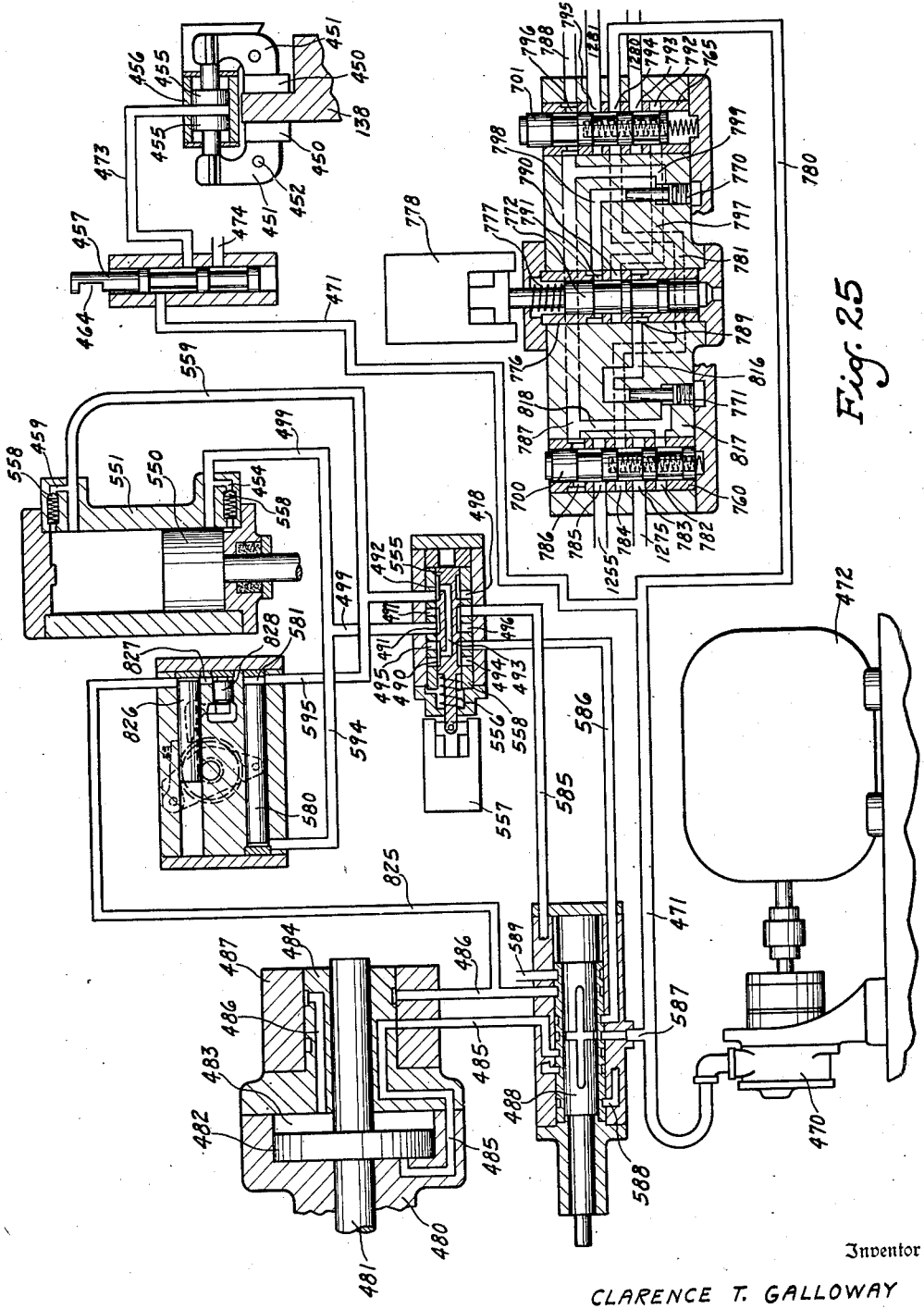

Patented Feb. 26, 1946

2,395,544

UNITED STATES PATENT OFFICE 2,395,544

GEAR GRINDING MACHINE

Clarence T. Galloway, Rochester, N. Y., assignor to Gleason Works, Rochester, N. Y., a corporation of New York Application October 20, 1943, Serial No. 506,946

24 Claims. (Cl. 51—52)

The present invention relates to machines for grinding gears and particularly to machines for grinding longitudinally curved tooth gears, such as spiral bevel and hypoid gears, in a generating operation.

In machines for grinding spiral bevel and hypoid gears in a generating operation, the tool ordinarily used is an annular grinding wheel, and grinding of the sides of the gear teeth is accomplished by rotating the wheel in engagement with the work while effecting a relative rolling motion between the wheel and work as though the gear being ground were rolling with a basic gear or mate gear represented by the wheel. Usually, at least a rough-grinding and a finish-grinding operation are performed on each tooth side. Where gears are ground from the solid, many rough-grinding operations are required prior to finish-grinding in order to remove the stock and form the tooth spaces of the work.

Conventional machines may be adjusted to effect a number of generating cycles, equal to the number of teeth in the gear to be ground, but after grinding once around all the teeth of the gear, the machine stops. In other words, conventional machines will complete only one grinding cycle, either rough-grinding or finish-grinding, and then stop. If more than one rough-grinding operation is necessary, the operator must advance the work manually relative to the wheel between successive rough-grinding operations so that on each succeeding rough-grinding operation, the wheel may grind deeper into the work, and then the operator must manually restart the machine. Between rough-grinding and finish-grinding, the operator must also restart the machine manually and may also be required to advance the work manually relative to the wheel. The wheel advance is not always effected between rough-grinding and finish-grinding, as sometimes finish-grinding may be simply a cleaning-up operation in which the tooth surfaces are reground at the same depth as in the previous rough-grinding operation, so as to eliminate any remaining inaccuracies in the gears and produce the required tooth-surface finish.

Bteween rough-grinding and finish-grinding the wheel is always dressed, and, if there are many rough-grinding operations to be performed, as when a gear is to be ground from the solid, it is the practice to dress the wheel also one or more times while rough-grinding to prevent the wheel from loading up and to keep it coarse enough to rough-grind the tooth sides fast and without burning. In conventional machines, the dressing mechanism is manually controlled, sometimes even manually actuated.

With conventional machines, then, the operator has to be in practically constant attendance on a machine to see that the work is advanced after each grinding operation, that the wheel is dressed when required, and that the machine is restarted after work-advance or after dressing, and so forth. Moreover, with conventional machines, special training and judgment are required on the part of the operator to be sure that particularly on a job, which is to be ground from the solid, the wheel is dressed at the proper times. In these days of manpower shortage and lack of skilled help, the necessary training and judgment are not always available.

The primary object of the present invention is to eliminate the human factor as far as possible from the operation of gear grinding machines of the type described by providing a generating type of spiral bevel and hypoid gear grinder which will be fully automatic in operation, and in which all operations, including work-advance and dressing, may be performed automatically and in proper sequence from the time the work is placed in the machine until it has been finish-ground.

Another object of the invention is to provide a fully automatic machine of the character described which will be practically universal in regard to the adjustability of its controls, so that the amount of stock to be ground off the teeth of the work in each grinding operation, the number and occurrence of the dressing operations, the amount of stock to be removed from the wheel in each dressing operation, etc., may be varied and may be predetermined.

Other objects of the invention will be apparent hereinafter from the specification and from the recital of the appended claims.

In the drawings, the invention has been illustrated as applied to a gear grinding machine of the type disclosed in the Wildhaber Patent No. 2,252,743 of August 19, 1941, and in this respect, the present invention constitutes an improvement on said Wildhaber patent. It is to be understood, however, that the invention is not limited to use on this type of machine but is capable of general application.

In the machine illustrated in the drawings, as in the machine disclosed in the Wildhaber patent, the work rotates continuously in one direction and at a uniform velocity during a grinding cycle, while the grinding wheel, which also rotates continuously, has an oscillatory movement and an alternate feed and withdrawal movement. Thus, the wheel is fed into engagement with the work, and then is swung in one direction in time with the rotation of the work to generate-grind a tooth surface of the work, and is then withdrawn clear of the work and swung back to original position. During the return swing of the wheel, the continued rotation of the work serves to bring another tooth of the work into position to be ground. This completes a generating cycle. Then a new generating cycle begins with feed of the wheel back into engagement with the work. So the machine proceeds until all of the teeth of the gear have been ground once, completing a grinding cycle. Then the automatic stop mechanism of the machine is tripped.

In the machine disclosed in the Wildhaber patent, the tripping of the automatic stop mechanism stops the operations of the machine. If the operator wants to grind more stock off the work, he must advance the work manually into the wheel the required distance before restarting the main drive motor of the machine to commence a new grinding cycle. If he considers it advisable to dress the wheel before a new grinding cycle is started, he must also manually actuate the dressing mechanism before restarting the main drive motor.

In the machine illustrated in the accompanying drawings, the tripping of the automatic stop mechanism does not stop the machine. It sets in motion mechanism which causes the work to be advanced with reference to the wheel and which also, between preselected successive grinding cycles, causes the generating motions of the machine to be stopped and the wheel to be dressed. Then, after the work has been advanced the required amount and the wheel has been dressed, if dressing is in order, a new grinding cycle is automatically restarted.

The depth to which the work may be fed into the wheel in any grinding cycle is controlled by an indexable stop-plate. This stop-plate is carried by a sliding base on which the work is mounted. It has a plurality of steps or lands formed on its front face which are of progressively varying height, and which are adapted to cooperate selectively and progressively with a positive stop member which is secured to the frame of the machine to determine the depth-feed position of the work. When, for instance, the land, that is of greatest height, is cooperating with the positive stop, the sliding base is held in its furthest-out position so that the work is fed the least distance toward the wheel, while when the land, which is of least height, is cooperating with the positive stop, the sliding base is allowed to move into its furthest-in position and the wheel can grind the work to maximum depth.

The stop-plate is adapted to be moved step-by-step and is automatically advanced one step after each grinding cycle. The sliding base is fluid-pressure operated and so is the stop-plate. When the automatic stop mechanism of the machine is tripped at the end of a grinding cycle, it causes a valve to be shifted which controls the direction of movement of the sliding base and the step-by-step advance of the stop-plate. The sliding base is withdrawn automatically from operative position a sufficient distance to disengage the stop-plate from the positive stop, and the stop-plate is advanced automatically one step. Then the valve is reversed and the sliding base is automatically fed back into operative position as far as is permitted by the height of the particular land on the stop-plate which is now in registry with the positive stop. Then, unless the wheel is to be dressed, the grinding operation is resumed with the grinding wheel grinding at the new depth determined by the new position of the stop-plate.

The stop-plate controls not only the distance of feed of the work into the wheel, but also the dressing of the wheel. There are a series of buttons on the periphery of the stop-plate which may be adjusted different distances apart. Each time one of these buttons comes into engagement with a limit switch, which is suitably mounted on the machine, the main drive motor of the machine is stopped and a motor is started which drives a series of cams that control the operation of the dressing mechanism, and the dressing mechanism goes through its cycle to dress the grinding wheel. The rate of dressing is selectively controlled by two adjustable throttle valves, one of which is adjustable to permit of a fast rate of movement of the dressing tools over the wheel for rough-dressing and the other of which is adjustable to limit the movement of the dressing tools to a slow rate for finish-dressing. If a button is so positioned on the stop-plate that in the indexing movement of the stop-plate the button trips the limit switch momentarily and then passes on, the wheel will be rough-dressed, but if a button is so positioned that the stop-plate stops, at the end of its indexing motion, with the button in engagement with the switch, then the throttle valve that controls the finish-dressing will be rendered operative, and the wheel will be finish-dressed. When the dressing operation is nearly completed, the main drive motor of the machine is automatically restarted by operation of a cam driven by the motor which actuates the dressing mechanism. On completion of the dressing operation, the motor, which actuates the dressing mechanism, is automatically stopped by operation of another cam.

Alternate grinding of the work and advance of the work into the wheel with dressing of the wheel, when wheel-dressing is predetermined, continues until the stop-plate has been indexed far enough to bring a final stop button, which is carried by the plate, into position to trip a limit switch to stop all of the machine except the motor which drives the fluid-pressure pump. The work will then have been completed, for the operator initially adjusts the stop-plate away from the final position far enough to allow of completion of the required number of grinding operations on the work before the final stop button arrives at the stopping position. The operator then manually shifts a control valve to withdraw the sliding base to inoperative position, reset the adjustable stop-plate, and dechuck the completed gear. The completed gear may then be removed from the machine and a new work-piece chucked thereon.

The principal features of the invention and the method of operation of the machine shown in the accompanying drawings have been described in general terms. Reference will now be had to the drawings for more detailed description of the invention and of this machine.

In the drawings:

Fig. 5 is a part plan, part transverse sectional view, showing certain details of the side-dressing mechanism and of the cam and limit switch which controls the time of dressing;

Fig. 6 is an elevational view, further illustrating this cam and limit switch;

Fig. 17 is a side elevation, with parts broken away, of the control box which governs the dressing cycle;

Fig. 19 is a sectional view through this box taken on the line 19—19 of Fig. 18;

Fig. 20 is a fragmentary horizontal sectional view through the box taken in a plane parallel to the plane of Fig. 18 and showing particularly the two throttle valves controlling the rates of rough and finish dressing, respectively, and the selector valve which determines which of the throttle valves is to be in operation at a particular time;

Figure 21:
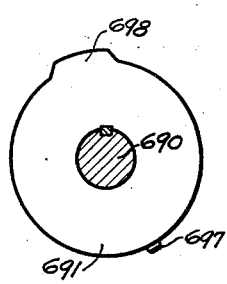
Figure 22:
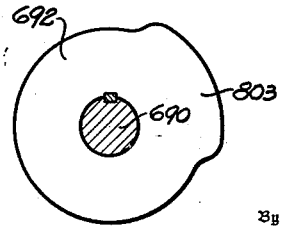
Figure 23:
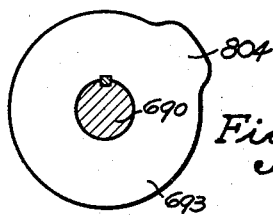
Figure 26:
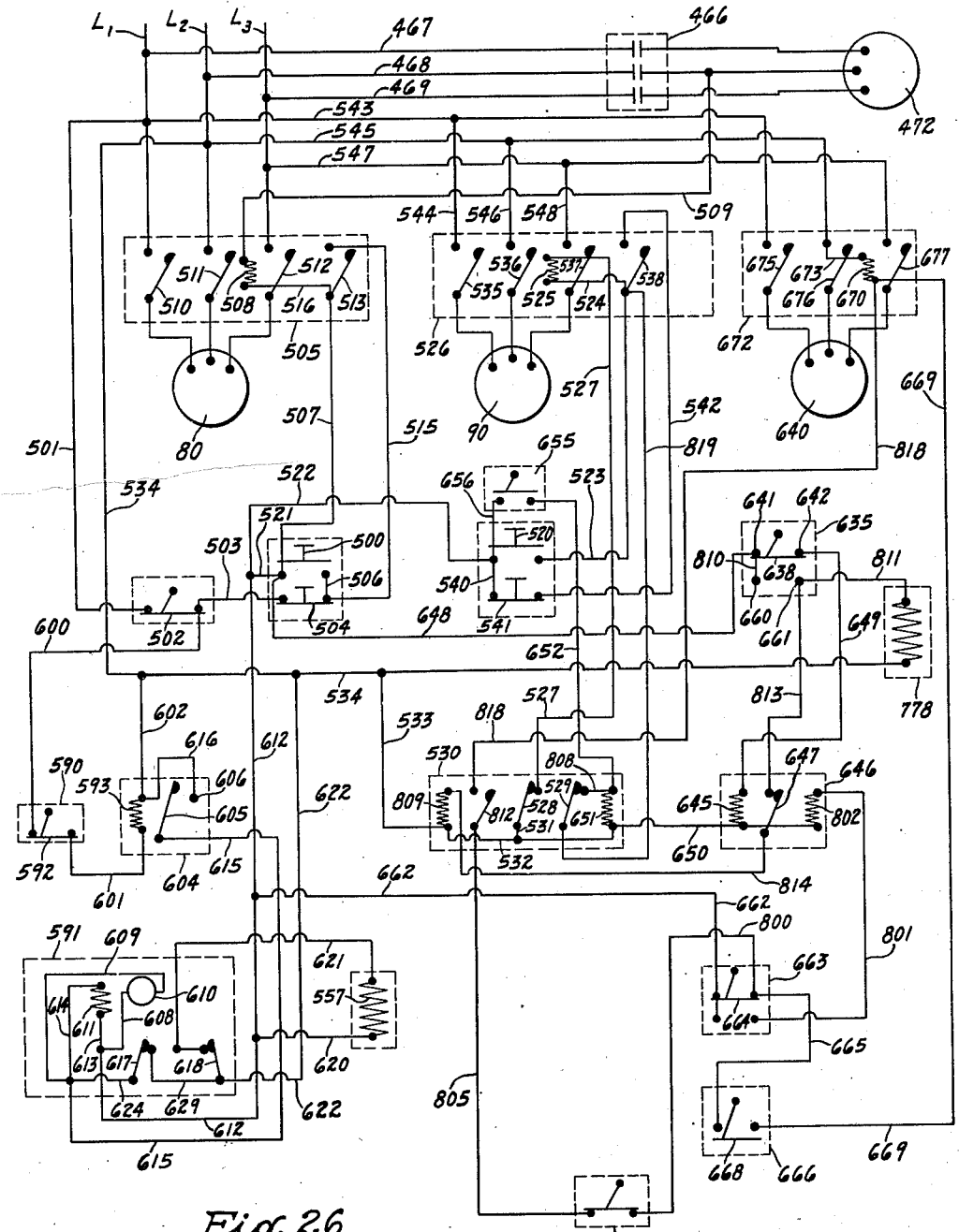

Figs. 21 to 23 inclusive are detail views, showing the several cams which control the dressing cycle;

Fig. 24 is a detail sectional view of the solenoid and reverse valve which control the movements of the sliding base and of the variable stop plate;

Fig. 25 is a diagrammatic view showing the hydraulic circuit of the machine; and Fig. 26 is a diagrammatic view showing one way in which the various electrical parts of the machine may be wired to obtain the desired cycle of operation.

As has already been stated, the machine illustrated in the drawings is an improvement on the machine of Wildhaber Patent No. 2,252,743. The parts, which are common to the present machine and to the machine of the Wildhaber patent, are shown only to the extent necessary to an understanding of the present invention. For a more detailed description of these parts, reference should be had to the Wildhaber patent. These parts are identified in the drawings of the present application by the same reference numerals as employed in the Wildhaber patent, namely, by reference numerals between 20 and 450. Any suitable dressing mechanism may be used on the machine. That shown is similar to the dressing mechanism disclosed in the pending application of Paul F. Barker et al., Serial No. 496,452, filed July 28, 1943. Parts, which are common to the dressing mechanism here used and to the dressing mechanism of the Barker et al. application, are shown only to the extent necessary to an understanding of the present invention. For a more detailed description of these parts, reference may be had to the Barker et al. application. These parts are identified in the drawings of the present application by the same reference numerals as employed in the Barker et al. application, except that these reference numerals are increased in the present application by a thousand. Thus, a part, which is identified in the Barker et al. application by the reference numeral 90, will, if employed in the dressing mechanism of the present application, be identified by the reference numeral 1090, etc. Parts which are new to the machine of the present invention, are designated by reference numerals between 450 and 1000.

Figure 3:
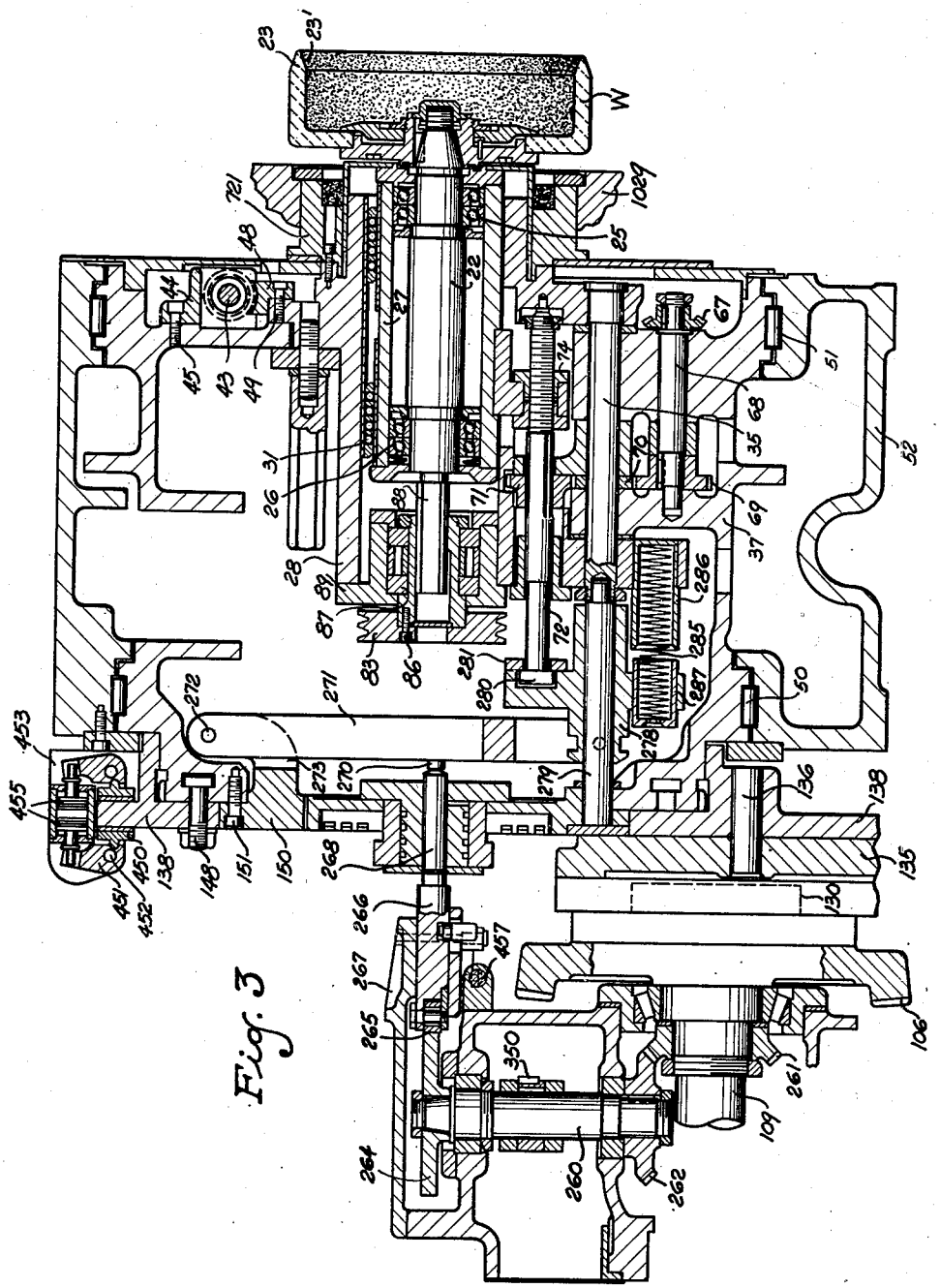
Fig. 3 is a vertical sectional view through the cradle and showing, also, parts of the cradle oscillating mechanism and of the wheel feed mechanism.

20 denotes the base of the machine, W the grinding wheel, and G the gear which is to be ground. The grinding wheel W is a rotary annular wheel and has active outside and inside surfaces 23 and 23', respectively, (Fig. 3), which converge to its tip surface. The wheel is mounted, as described in the Wildhaber patent, upon a spindle 22 (Fig. 3) which is journaled on antifriction bearings 25 and 26 in a sleeve 27. The sleeve 27 is mounted on spaced roller bearings in a carrier 28 for adjustment and sliding movement in the direction of the axis of the wheel spindle 22. One set only of these roller bearings is shown in the drawings, and the front and rear bearings of this set are each denoted at 31.

Figure 2:
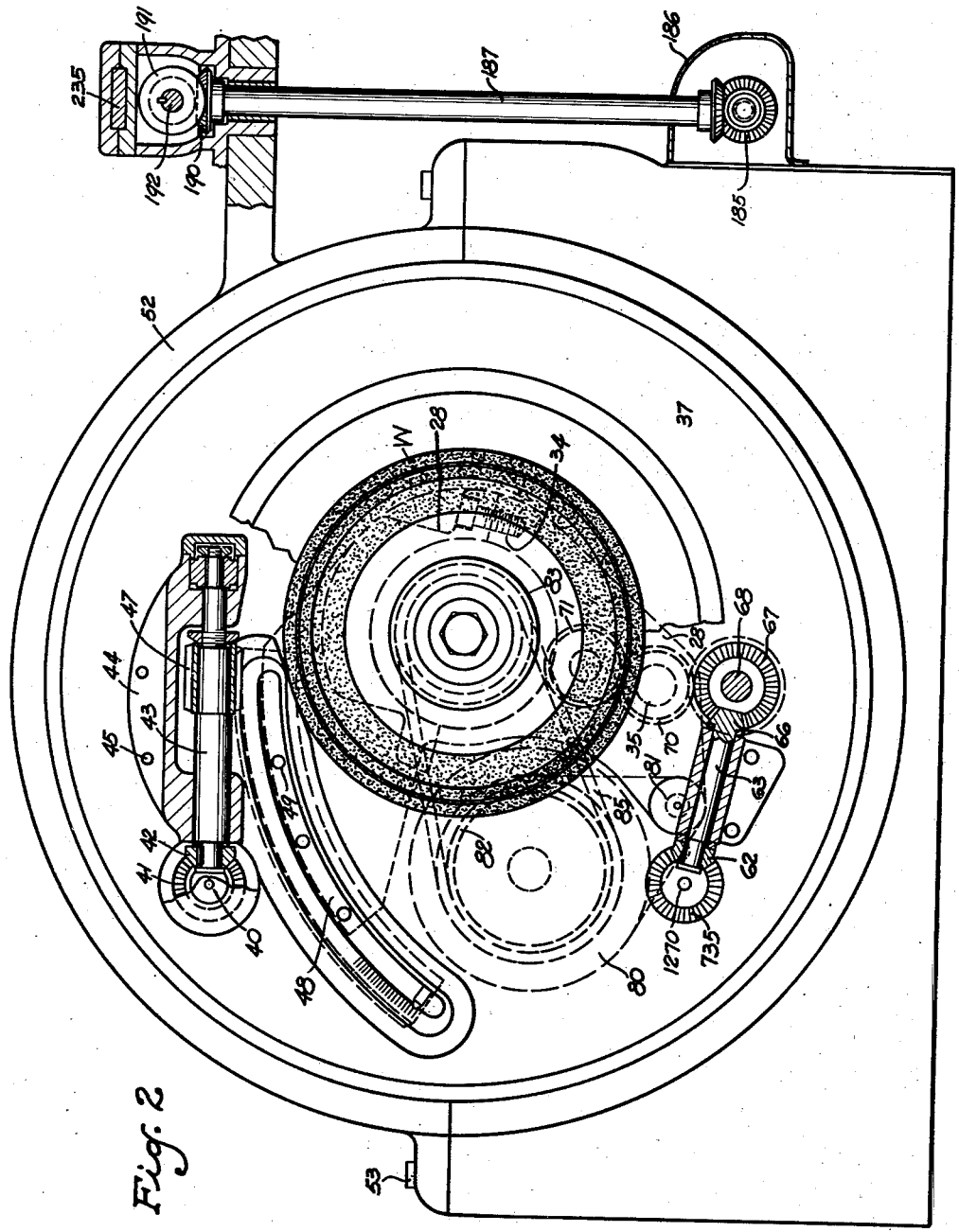
Fig. 2 is an elevational view looking at the front of the cradle of this machine, parts being broken away and shown in section, and the dressing mechanism again being removed.

The carrier 28 is made in two parts for convenience of assembly, and the two parts are bolted together by screws 34 as shown in Fig. 2. The carrier 28 is mounted in the cradle 37 of the machine for pivotal adjustment about the axis of a stud or trunnion 35 (Figs. 2 and 3) which is secured in the cradle 37 and which extends in a direction parallel to the axes of both the wheel spindle and the cradle.

The adjustment of the carrier on the cradle is for the purpose of positioning the grinding wheel with reference to the work in accordance with the spiral angle of the teeth which are to be ground. This adjustment is effected by rotation of a shaft 40 (Fig. 2) which is journaled in the cradle. The shaft 40 carries a bevel pinion 41 at its rear end which meshes with a bevel gear 42 that is secured to a shaft 43. The shaft 43 is journaled in the bracket 44 that is secured to the cradle by screws 45. It has a worm 47 keyed to it which meshes with a worm wheel segment 48 that is secured by screws 49 to the carrier 28.

The cradle 37 is a full circular cradle. It is mounted on spaced roller bearings 50 and 51 (Fig. 3) in a split housing 52 whose parts are secured together by screws 53. The lower part of this housing is secured to or is integral with the base of the machine.

During operation of the machine, the grinding wheel W is driven continuously from a motor 80 (Fig. 2) which is pivotally mounted on a stud 81 that is secured in the carrier 28. The armature shaft of the motor carries a pulley 82 which drives the pulley 83 through a belt 85. The pulley 83 (Fig. 3) is secured by screws 86 to a sleeve 87 that has a sliding splined connection with the reduced inner end portion 88 of tool spindle 22. The sleeve 87 is journaled on anti-friction bearings in a bracket 89 which is secured in any suitable manner to the rear end of the carrier 28.

During a grinding cycle, the cradle 37 is oscillated back and forth, being driven from a motor, which is mounted in the base of the machine and which is not shown, except for the diagrammatic illustration in Fig. 26 where it is denoted at 90. The cradle drive, as disclosed in the Wildhaber patent, includes a bevel gear 106 (Fig. 3) to which there is adjustably secured a cam 130. This cam engages in a slot that has straight parallel sides and that is provided on a plate 135. The plate 135 is mounted on a stud 136 that is secured in a ring-like member 138 which is adjustably fastened to the cradle 37 by bolts 148. The cam 130 is so formed, as described in the Wildhaber patent, as to rock the cradle alternately in opposite directions as the cam rotates on its axis.

As the cradle swings in one direction, the grinding wheel is in operative engagement with the work, but during the return roll of the cradle, the grinding wheel is withdrawn from engagement with the work. The means for moving the grinding wheel into and out of operative position comprises a shaft 260 (Fig. 3) and a cam 264 which is keyed to the shaft. The shaft 260 is driven from the shaft 109, through the bevel gears 261 and 262. The cam 264 is keyed to the upper end of the shaft 260, and engages a roller 265 that is journaled in one end of a rod 266. The rod 266 slides in a guide 267 which is secured to the base or frame of the machine, and engages at its opposite end with one end of a hardened rod 268 which is slidably mounted in the end plate 150 of the cradle 37. The hardened rod 268 engages at its opposite end with a hardened button 270 that is secured in a lever 271.

The lever 271 is pivoted at one end by means of a pin 272 between ears 273 that are formed integral with the plate 150. At its opposite end, the lever 271 is forked to engage a sleeve or spool 278. The spool 278 is mounted to slide on a stud 279 which is mounted in axial alignment with the stud 35. Stud 279 is mounted at one end in the stud 35 and at its opposite end in the plate 150. Spool member 278 is provided at its forward end with a recess that receives the enlarged head 280 of the rear end of the shaft 72. The head 280 is held in the recess by a plate 281. The shaft 72 threads into a nut 74 which is carried by the sleeve 27. Hence, as the spool is moved axially on the stud 279 by operation of cam 264, rod 266 and lever 271, the shaft 72 is also moved axially to impart axial movement to the sleeve 27 and grinding wheel W.

The ratio of the gearing 261—262 is such that the cam 264 makes one revolution per oscillation of the cradle, and the cam 264 is so formed that in a revolution, the grinding wheel is moved into operative engagement with the work, is held in operative engagement during the generating up-roll of the cradle, is withdrawn from operative position at the end of the up-roll, and is held out of operative position during the return roll of the cradle.

A coil spring 285, that is interposed between a thimble 286 and a thimble 287, serves to hold the roller 265 against the periphery of the cam 264 and to effect the withdrawal movements of the grinding wheel W. The thimble 286 has a pressed fit in an opening in the carrier 28. The thimble 287 is secured in the spool or sleeve 278.

During the generating roll of the cradle, a frictional brake-load is applied to the cradle to take up all back-lash in the cradle drive and assure the utmost accuracy in the cradle motion. For this purpose, a pair of brakeshoes 450 (Figs. 3 and 25) are provided. These brakeshoes are adapted to engage opposite sides of the ring-like member 138 which is bolted to the cradle. Each brakeshoe is carried by one arm of a bell-crank lever 451 which is pivoted on a pin 452 in a bracket 453 that is secured in any suitable manner to the cradle housing 52.

The brakeshoes are moved into and held in operative position by hydraulic pressure applied between the two pistons 455 that are secured to the free arms of the bell-cranks 451. The pistons are reciprocable in a cylinder 456 which is secured to or formed integral with the bracket 453. The movements of the pistons are controlled by a valve 457 (Figs. 3, 7, 8, and 25) which is mounted to reciprocate in a valve casing 458 that is secured in any suitable manner to the base 20. The valve is connected to the rod 266 to be operated by the rod under actuation of cam 264. The connection comprises a bell-crank lever 460 which carries a roller 461 on one arm that engages in a slot 462 in the bar 266 and which carries a roller 463 on its other arm that engages in a slot 464 formed in the stem of the valve. The bell-crank is pivoted by means of stud 465 in the guide 267.

The motive fluid is supplied to the valve 457 from the pump 470 (Fig. 25) through the duct 471. The pump is mounted in the base of the machine and is driven by a motor 472 which may also be mounted in the base of the machine. The valve 457 is connected with the cylinder 456 by a duct 473 through which the motive fluid may be supplied to or exhausted from the cylinder, depending on the position of the valve. The motive fluid is exhausted from the valve through a duct 474 which leads back to the sump of the machine.

From the preceding description, it will be seen that the cam 264 controls the movement of the valve 457 and that when the grinding wheel is in forward position, that is, during the generating roll, the duct 473 is on supply, causing the brakeshoes 450 to apply a frictional drag on the cradle, while when the grinding wheel is in withdrawn position, that is, during the return roll, the duct 473 is on exhaust, relieving this drag on the cradle.

The movement of the valve 457 is used not only to control the brakes 450 but also to operate a limit switch 475 (Figs. 7 and 8) which is mounted on the base of the machine. This limit switch, as will be described further hereinafter, serves to insure that the grinding wheel is in withdrawn position when it is dressed. It is operated by a disc 476 which is threaded into a sleeve 477 that slides on a stud 478. The stud 478 is threaded into the guide 267. A coil spring 479, which is interposed between the head of the stud 478 and the flanged end of the sleeve 477, serves constantly to urge the disc 476 to the right in Fig. 8. The disc is held by the spring in contact with the stem of the valve 457 and when the valve is moved to the left, as occurs on withdrawal of the grinding wheel from operating position, the valve moves the disc against resistance of the spring to close the limit switch.

As the cradle oscillates back and forth, the work spindle is driven continuously at a uniform velocity from the main drive motor of the machine through gearing which is not here illustrated in detail but which is shown clearly in the Wildhaber patent and which includes the gearing 185, 186, the shaft 187, and bevel gears 190 and 192 (Fig. 2). The uniform rotation of the work spindle operates in conjunction with the movement of the cradle in one direction to cause the rotating grinding wheel to generate the proper tooth profiles on the work, while the rotation of the work spindle during the return movement of the cradle serves to index the work.

The work spindle 480 (Fig. 25) is suitably journaled in a work head 207 (Fig. 1), and the work piece G, which is to be ground, is secured to this spindle 480 in any suitable manner. As indicated in Fig. 25, this may be through a standard hydraulic chuck operated by a draw-bar 481 and a piston 482 that is secured to the draw-bar. The piston reciprocates in a cylinder 483 formed by the spindle 480 and end-plate 484. The motive fluid is supplied selectively to opposite sides of the piston 482 through ducts 485 and 486, respectively, which are drilled in the end-plate 484 and spindle 485, and in the bearing 487 in which the spindle is journaled.

The work head 207 is mounted for vertical adjustment on a column 210. This adjustment permits of using the machine to grind either spiral bevel or hypoid gears. The column 210 is mounted on a swinging base 220 for adjustment in a direction parallel to the axis of the work spindle. This adjustment is for the purpose of positioning the work in accordance with the cone distance of the gear to be ground. The swinging base 220 is mounted for angular adjustment on a sliding base 224. This angular adjustment is for the purpose of locating the work in accordance with the root angle of the gear which is to be ground. The swinging base 220 is secured in any adjusted position on the sliding base 224 by T-bolts 226 which engage in a T-slot 227.

Figure 9:
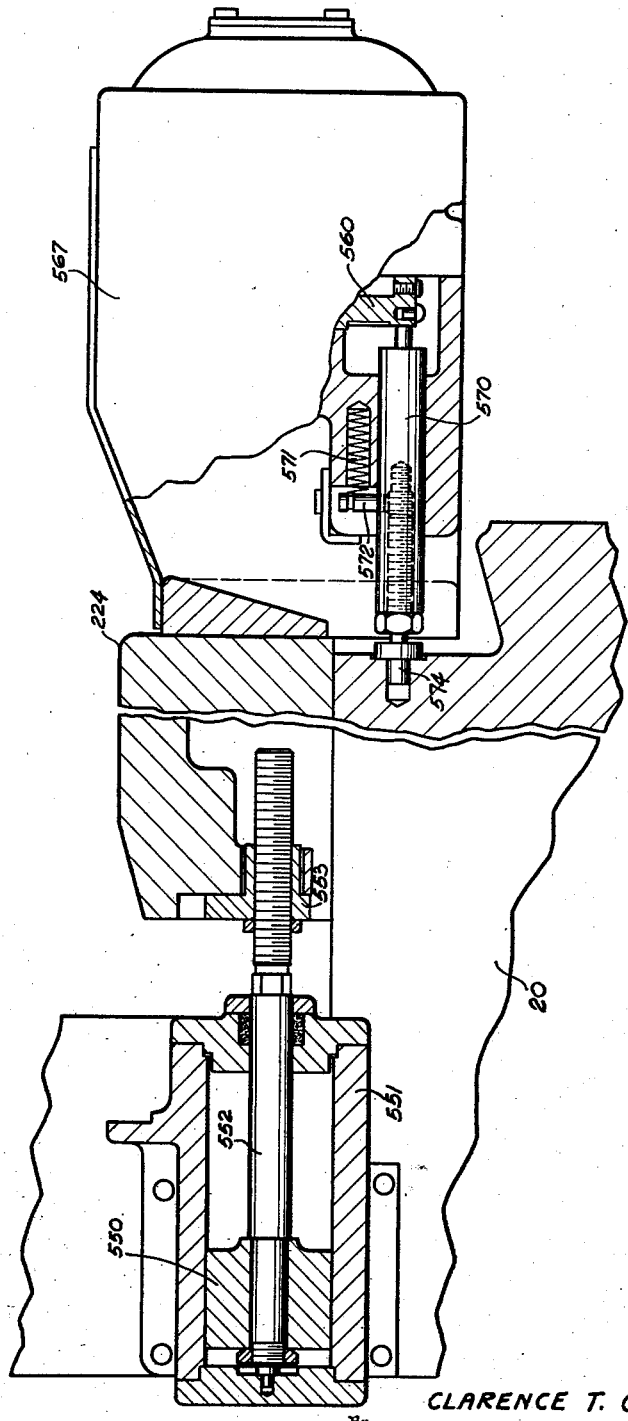
Fig. 9 is a fragmentary sectional view showing the mechanism for moving the sliding base on the frame of the machine and the variable stop mechanism for limiting the distance of advance toward the wheel of the sliding base and of the work carried thereby.

The sliding base 224 is slidable on the base 20 of the machine to move the work to and from operative relation with the grinding wheel. The sliding base 224 is moved to and from operative position by a piston 550 (Figs. 9 and 25). This piston reciprocates in a cylinder 551 which is secured to the base 20 of the machine. The piston is secured to a piston rod 552 which is threaded externally of the cylinder 551 and engages in a nut 553 that is secured to the sliding base 224.

The movement of the piston 550 is controlled by a reverse valve 555 (Fig. 25) of standard construction which is constantly urged in one direction by a coil spring 556 and which is moved in the opposite direction by energizing a solenoid 557, that is connected to the stem of the valve. This solenoid is energized at the end of each grinding cycle when the automatic stop mechanism is tripped, as will be described more fully hereinafter.

The valve 555 is provided with peripheral grooves 490, 491, and 492 and with a duct 493 which connects the grooves 490 and 492. The valve slides in a sleeve 558 which is provided with five series of radially disposed ports, denoted at 494, 495, 496, 497 and 498, respectively. The valve is connected to opposite ends of cylinder 551 through ducts 499 and 559. These ducts connects with the cylinder directly and they also communicate with the cylinder through auxiliary ducts 454 and 459, respectively, which are controlled by ball-check valves 554 and 558, respectively, so that dash-potting is obtained at the ends of the stroke of piston 550.

Figure 1:
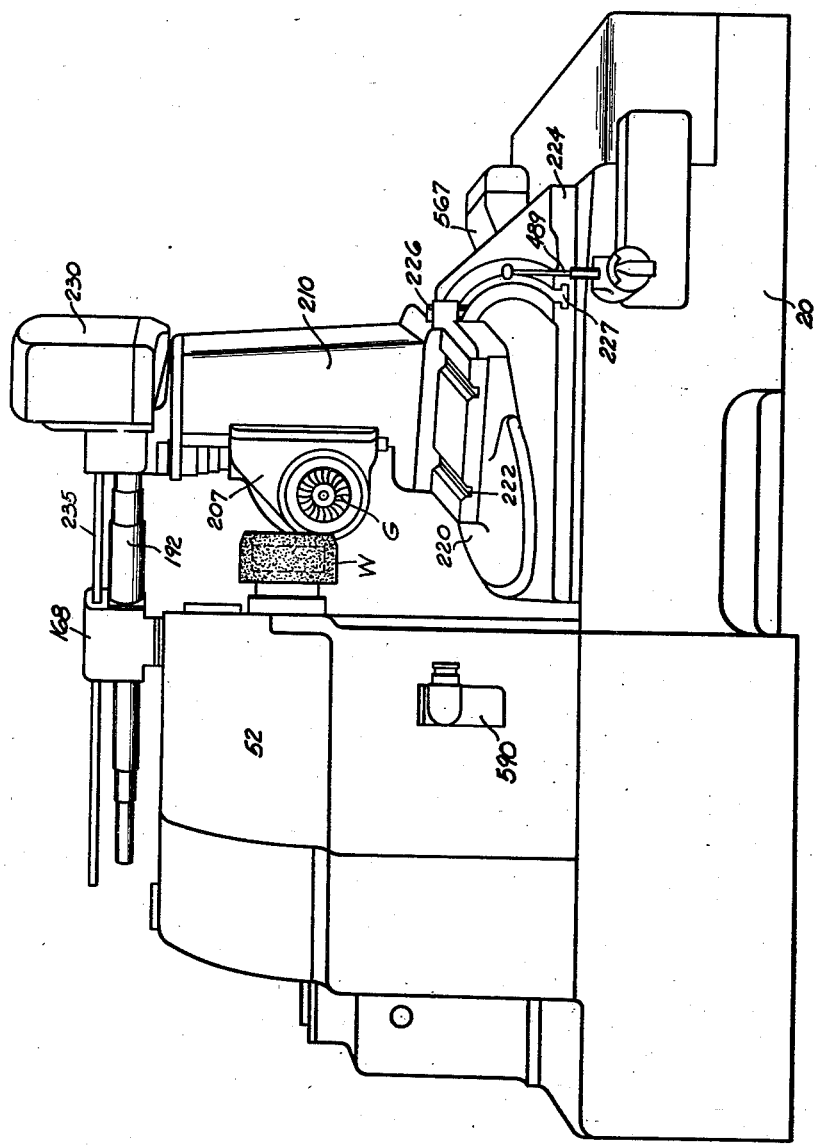
Fig. 1 is a perspective side view of a spiral bevel and hypoid gear grinding machine built according to one embodiment of this invention, the wheel-dressing mechanism being removed therefrom in the interest of clearness in illustration.

The direction of flow of the motive fluid to the valve 555 is controlled by a manually operable valve 488 which is rotatably mounted in the base of the machine and which may be operated by the lever 489 (Fig. 1). This valve is connected to the valve 555 by ducts 585 and 586 which communicate with ports 497 and 495, respectively, of sleeve 558. This valve is also connected to chuck-piston 482 by ducts 485 and 486. The motive fluid is supplied to valve 488 through the duct 587 which connects with duct 471. It is exhausted from this valve 488 through the ducts 588 and 589 which lead back to the sump of the machine. The valve 488 is of standard form and is so constructed that in one position of its rotation, lines 586 and 486 will be on supply and lines 585 and 485 on exhaust, while in the other position of its rotation, lines 585 and 485 will be on supply and lines 586 and 486 on exhaust.

The distance which the sliding base 224 may be moved inwardly, that is, the depth at which the grinding wheel may engage the work in any grinding cycle, is governed by a rotatable stop-plate 560 (Figs. 9 to 14 inclusive). This stop-plate is keyed to the hub portion of a ratchet wheel 561 which in turn is keyed to a shaft 562. The shaft 562 is journaled at opposite ends in anti-friction bearings 563 and 564 which are carried by the two parts 565 and 566 of a housing, which is denoted as a whole at 567 in Fig. 1. The two parts 565 and 566 of the housing are bolted or fastened together in any suitable manner and the inner end of the housing is bolted or secured in any suitable manner to the sliding base 224.

The rotatable stop-plate 560 is formed on its front face with a plurality of steps or lands 568 that progressively increase in height around the circumference of the plate. The lands 568 are adapted to engage successively, on rotation of the stop-plate, with the outer end of a bar 570. This bar is slidably mounted in the housing part 565 and is constantly urged out of engagement with the stop-plate 560 by a coil spring 571 which is housed in a suitable recess in the housing part 565 and which is connected at one end to a pin 572 that is secured in the plunger bar 570. The plunger bar 570 has a hardened pin 573 threaded into its inner end. This pin is adapted to engage with the hardened head of a positive stop button 574 that is secured in a recess in the base or frame 20 of the machine.

When the sliding base 224 is in operative position, the pin 573 engages the stop button 574 and the bar 570 is forced into engagement with the stop-plate 560 against the resistance of spring 571. Then the height of the land 568, which is at the moment in engagement with the bar 570, determines the distance which the sliding base can move inwardly and thereby determines the depth to which the work can at that stage be ground. When the sliding base is in inoperative position, the bar 570 is, of course, disengaged from the stop button 574, and thus the spring 571 is free to move the bar 570 out of engagement with the stop-plate 560 to permit advance of the stop-plate or resetting of the stop-plate as will be described hereinafter.

In the machine illustrated, as already stated, after a grinding operation has been performed on each tooth, that is, after as many generating cycles are performed as there are tooth surfaces to be ground, the sliding base 224 is withdrawn from operative position and the stop-plate 560 is indexed. The time of occurrence of these steps is controlled by an automatic stop mechanism which may be of any suitable type, for instance, of the type illustrated in the Ford patent No. 1,908,626 of May 9, 1933. This automatic stop mechanism may be actuated by a cam 350 (Fig. 3) which is secured to the shaft 260 and which is therefore driven in time with the generating cam 130 and the feed cam 264.

Figure 10:
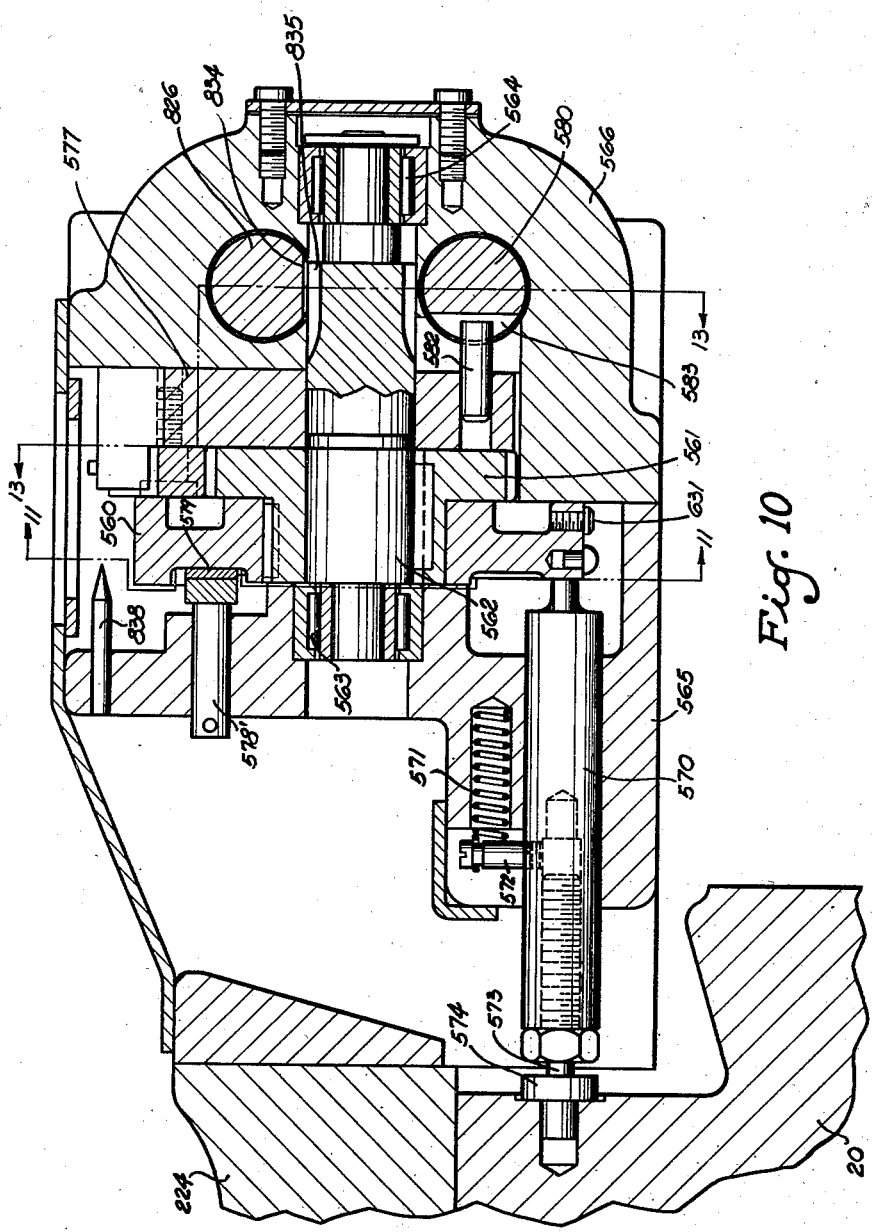
Fig. 10 is a vertical sectional view on an enlarged scale of the variable stop mechanism.

This automatic stop mechanism is so connected electrically to the solenoid 557 (Fig. 25), as will be described more particularly hereinafter, that when this automatic stop mechanism is tripped, it energizes the solenoid 557. This causes the reverse valve 555 to be shifted and the sliding base 224 to be withdrawn from operative position, disengaging the pin 573 from the stop button 574 (Fig. 10). It also causes the stop-plate 560 to be advanced as will now be described.

The stop-plate advancing mechanism includes the ratchet wheel 561 (Figs. 9 to 14 inclusive) which has already been referred to and which is keyed to the stop-plate. The ratchet wheel 561 is engaged by a pawl 575 (Figs. 10, 11, and 13) which is pivotally mounted on a pin 576 in a rocker arm 577. The rocker arm is oscillatably mounted on the shaft 562. The pawl 575 is constantly urged into engagement with the ratchet wheel 561 by a coil spring 578 which is mounted in the rocker arm 577. The rocker arm 577 is actuated by a piston 580 which is fluid-pressure operated and which is adapted to reciprocate in a cylinder 581 formed in the housing part 566.

The piston 580 is operatively connected with the rocker arm 577 through a pin 582 which is secured in the rocker arm and which engages in a slot 583 cut transversely across the piston 580. Movement of the piston 580 is controlled from the same reverse valve 555 which controls the movement of the piston 550 that reciprocates the sliding base 224. This reverse valve is connected with opposite sides of the piston 580 by ducts 594 and 595, respectively, (Fig. 25) which communicate with the ducts 499 and 559, respectively. Thus, when the sliding base is withdrawn to disengage the hardened pin 573 from the stop 574, (Fig. 10) the piston 580 is actuated to advance the ratchet wheel 561 and the rotatable stop-plate 560. To prevent the stop-plate from overrunning in its indexing movement, a friction drag is applied to the stop-plate. For this purpose, a pin 578' is mounted in housing part 565. This pin has a friction head 579 which engages the front face of stop-plate 560.

The period, during which the solenoid 557 is energized, is controlled by a time-relay of standard construction as will be more fully hereinafter described, and when this time-relay has completed its cycle, the solenoid 557 is deenergized. This permits the reverse valve 555 (Fig. 25) to be shifted by the spring 556, causing the piston 550 to return the sliding base 224 to operative position with a new land of stop-plate 560 in engagement with bar 570 (Fig. 10).

Figure 12:
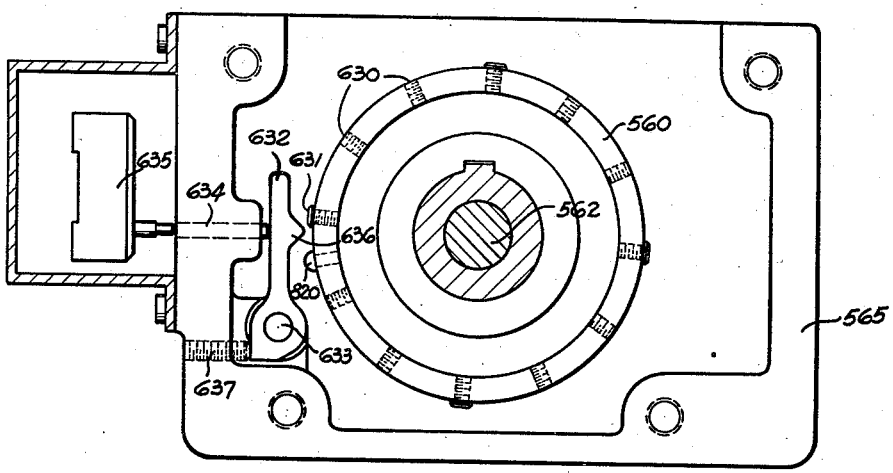
Fig. 12 is a sectional view through the variable stop mechanism, looking at the rear of the variable stop-plate and showing one of the limit switches, which is operated thereby.
Figure 13:
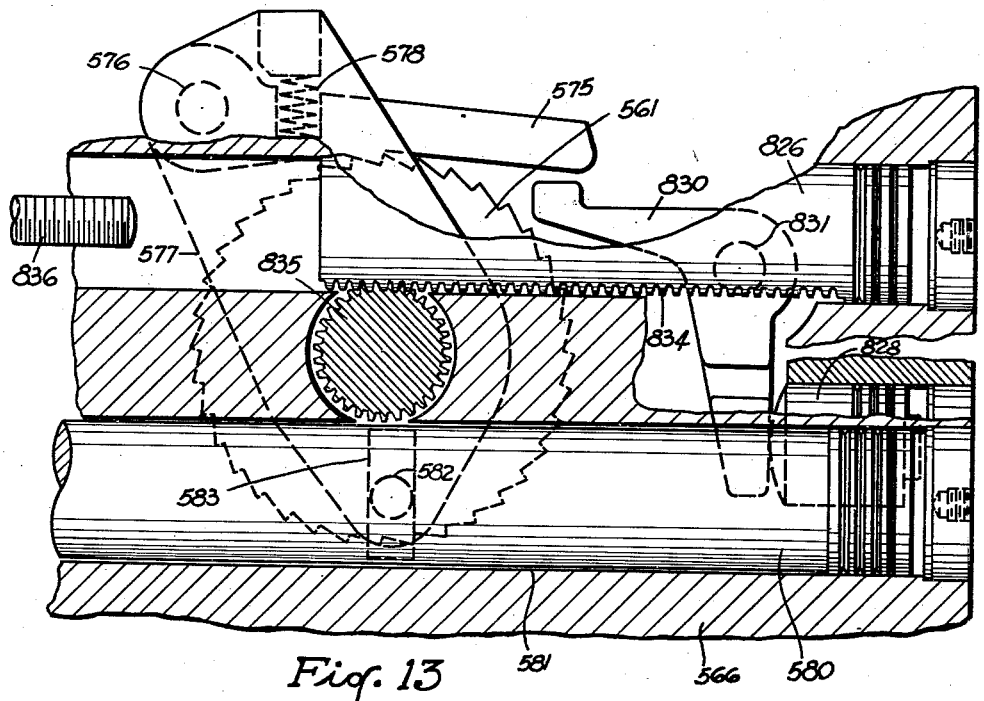
Fig. 13 is a section on line 13—13 of Fig. 10, looking in the direction of the arrows.
Figure 14:
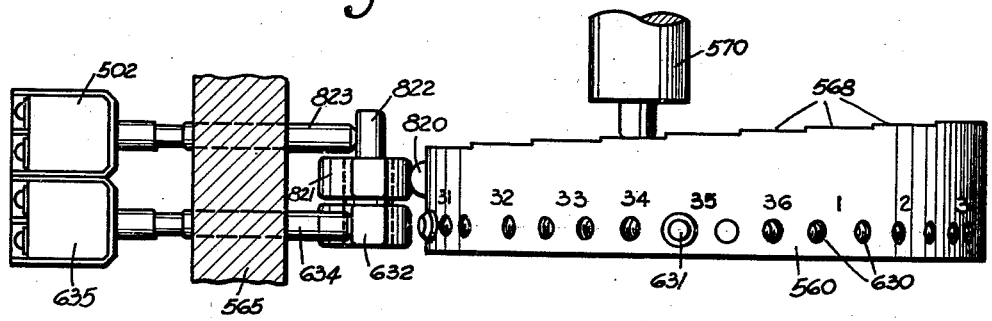
Fig. 14 is a plan view of the variable stop-plate and showing also the limit switches and stop plunger which the plate controls.

The rotation of the stop-plate 560 controls not only the depth of grinding but also the dressing of the grinding wheel. There are a plurality of holes 630 drilled into the periphery of the plate 560. These holes are adapted to receive the trip buttons 631 (Figs. 10, 12, and 14). The number of buttons used during the grinding of any particular gear depends upon the number of times which it is deemed necessary to dress the grinding wheel in the operation of grinding that gear. The buttons are placed by the operator around the periphery of the plate 560 in accordance with the intervals at which it is desired that dressing occur, that is, in accordance with the grinding cycles before which it is desired that the wheel be dressed.

The buttons 631 are adapted to cooperate with a switch arm 632 that is pivotally mounted on a pin 633 in the housing part 565. This switch arm is adapted to cooperate with a plunger 634 to actuate a limit switch 635 of standard construction. The plunger 634 is slidably mounted in housing part 565. When a button 631 passes over the beveled nose 636 of the arm 632 in the step-by-step rotation of the stop-plate 560, it pushes on the plunger 634 to close the limit switch 635 and start a motor 640 (Figs. 17 and 26) which operates the dressing mechanism. If, however, in a given indexing movement of the stop-plate 560, no button 631 engages arm 632, then the limit switch 635 is not closed and the motor 640 is not started, and hence, the wheel is not dressed. By the placing of the buttons 631 around the periphery of the stop-plate 560, then, the operator can predetermine whether or not at the end of a given grinding cycle, when the sliding base withdraws from operative position and the stop-plate 560 is indexed, the grinding wheel is to be dressed before a new grinding cycle begins. A set screw 637, that is threaded into housing part 565 and that engages the tail of arm 632, limits the inward movement of the arm 632 about its pivot 633.

Figure 18:
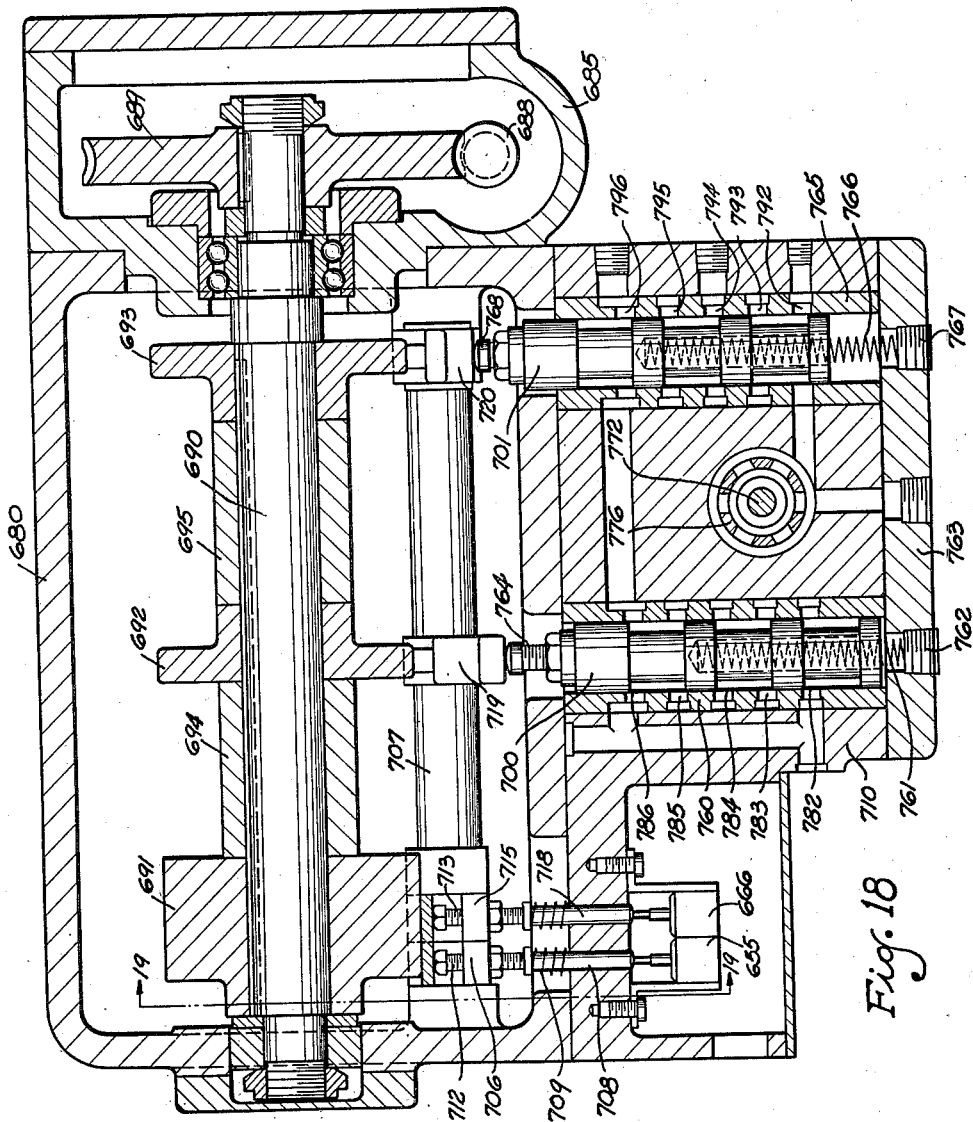
Fig. 18 is a horizontal sectional view through this box.

The motor 640 is mounted on a bracket 680 (Fig. 17) which is secured at any convenient point on the frame of the machine. The armature shaft of the motor is connected through a suitable coupling 681 with a shaft 682 that is integral with a bevel pinion 683. The shaft 682 is journaled on anti-friction bearings 684 in a housing 685 which is secured to the bracket 680. The bevel pinion 683 meshes with a bevel gear 686 which is keyed to a shaft 687 that is journaled on anti-friction bearings in the housing 685. The shaft 687 has a worm 688 formed on its lower end which meshes with a worm wheel 689 (Fig. 18) that is keyed to a shaft 690. The shaft 690 is journaled on suitable bearings in the bracket 680. This shaft has three cam members 691, 692, and 693 keyed to it and spaced from one another by spacer sleeves 694 and 695.

Just before the end of each dressing cycle, the main drive motor 90 is restarted, so that the ensuing grinding cycle may take place, and at the end of each dressing cycle, the cycle motor 640 is stopped. The cam 691 governs the starting of the main drive motor 90 and the stopping of cycle motor 640. It is provided on its periphery with two axially and angularly spaced lobes or lugs 697 and 698 (Figs. 19 and 21).

The lug 697 of cam 691 is adapted to engage a button 705 which is carried on the front side of a lever arm 706. This lever arm 706 is journaled on a shaft 707 which is fastened in the bracket 680 in parallelism to the shaft 690. The back side of the lever arm 706 engages a spring-pressed plunger 708 that is mounted in a casting 710 which is secured to the bracket 680. This plunger 708 engages at its opposite end with the plunger of a normally-open limit switch 655. When this limit switch is closed, the main drive motor 90 is restarted as will hereinafter be described.

The spring 709, which surrounds the plunger 708, serves to urge the lever 706 in one direction about its pivot 707. The movement of this lever arm in the other direction is limited by an adjustable stop screw 712 which is carried in a bracket arm 713 that is secured by screws 714 to the bracket 680.

The lug 698 of cam 691 is adapted to operate a lever 715 (Fig. 18) which is journaled on the shaft 707 in a manner similar to the lever 706 and which is connected operatively with a switch 666 through a spring pressed plunger 718 in a manner similar to the connection between the lever arm 706 and the plunger 708. The limit switch 666 is a normally-closed limit switch and when it is opened by action of cam 691 and plunger 718, the dressing cycle motor 640 is stopped. The lug or lobe 698 is so positioned on cam 691, therefore, as to allow completion of the dressing operation, on those occasions when the motor 640 is started, before this motor is stopped again.

The cams 692 and 693 are adapted to operate valves 700 and 701, respectively, through levers 719 and 720, respectively, which like the levers 706 and 715 are journaled on the rock-shaft 707. The valve 700 controls the movement of the dressing mechanism into and out of operative relation with the grinding wheel while the valve 701 controls the dressing operation itself as will be described more fully hereinafter.

Figure 4:
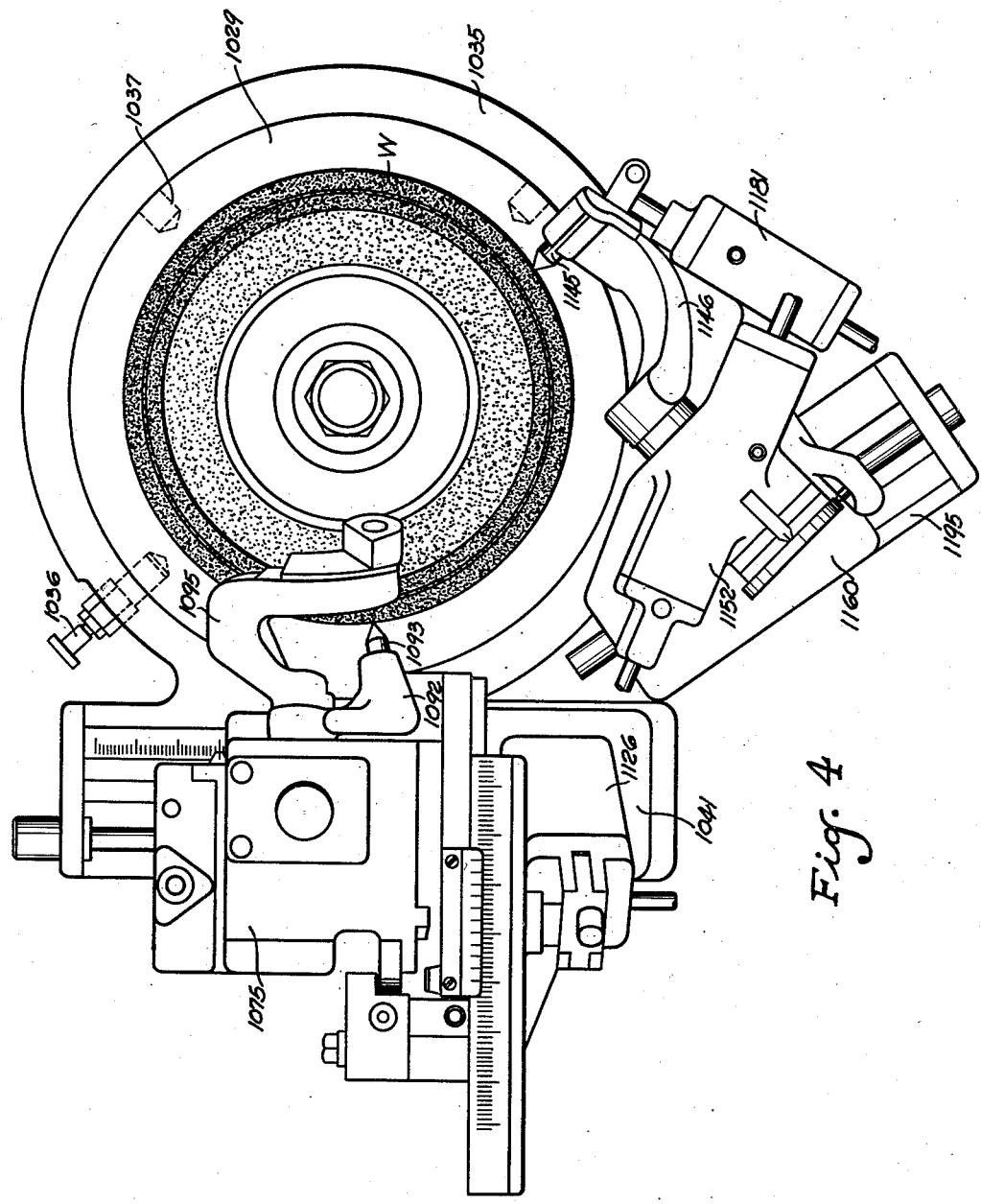
Fig. 4 is a fragmentary elevational view looking in the same direction as Fig. 2, and showing a known type of side and end-dressing mechanism mounted on the machine in operative relation to the wheel.
Figure 7:
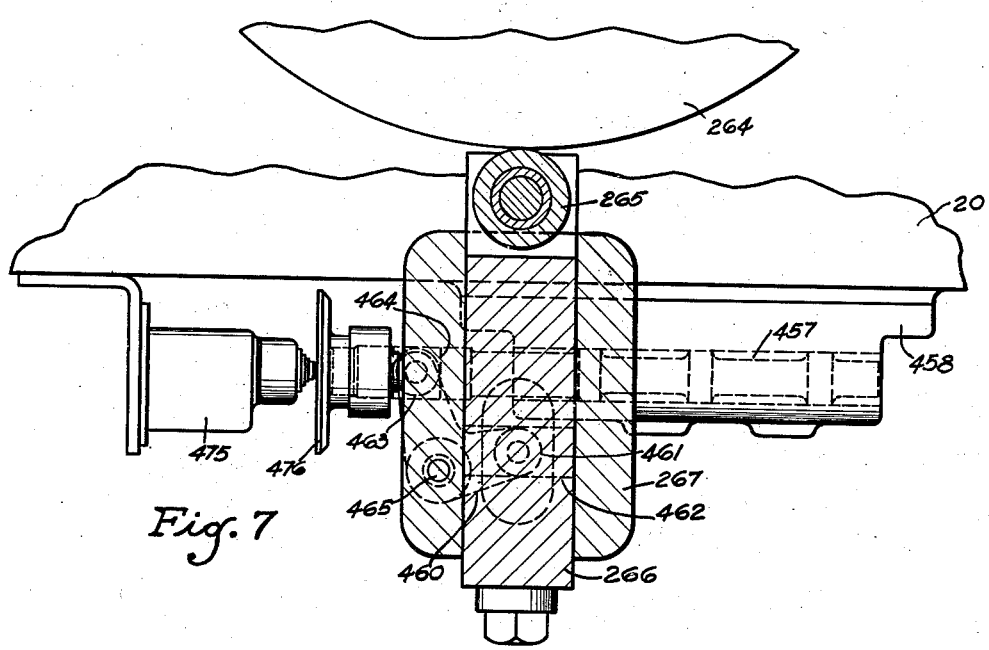
Fig. 7 is a fragmentary detail view, taken on the line 7—7 of Fig. 8, showing the valve which controls the cradle drag-brake, the limit switch which insures that the grinding wheel is in withdrawn position for dressing, and the mechanism for operating this valve and switch.
Figure 8:
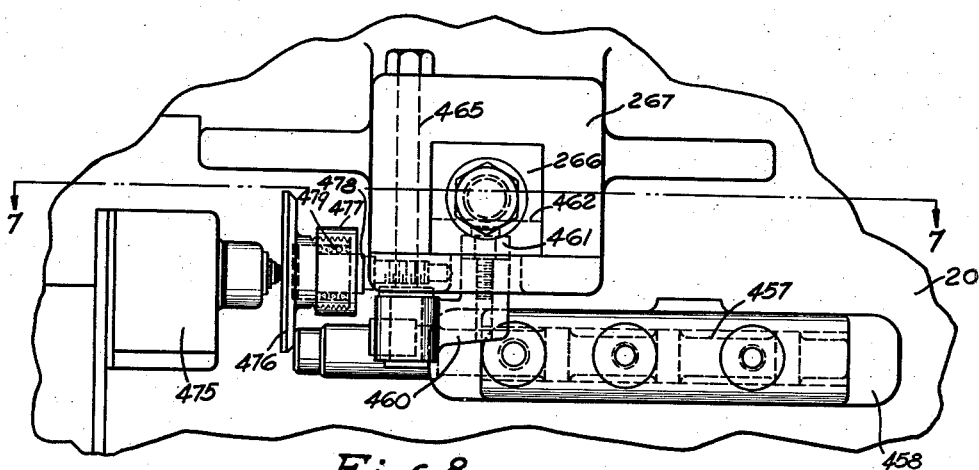
Fig. 8 is an end view of these parts.

The dressing mechanism employed on the machine of the present invention may be of any suitable type. As already stated, that shown in the drawings is of the same construction as the dressing mechanism disclosed in the copending application of Paul F. Barker et al., Serial No. 496,452, filed July 28, 1943. The dressing mechanism (Figs. 4 and 5) includes the outside-dressing tool 1093, the inside-dressing tool 1096, and the tip-dressing tool 1145.

The outside and inside-dressing tools are mounted in arms 1092 and 1095, respectively, which are secured to shafts 1090 and 1091, respectively, which are suitably journaled in a housing 1075. This housing is mounted for angular adjustment and for rectilinear adjustment in two directions on a bracket 1050 in a manner described in greater detail in the Barker et al. application. These adjustments are provided to permit positioning of the dressing mechanism in accordance with the pressure angles of the inside and outside surfaces to be dressed on the grinding wheel, and in accordance with the diameter and height of the wheel. The bracket 1050 is mounted on a slide 1041 for pivotal movement about a hinge pin 1051. This pivotal movement is for the purpose of swinging the dressers into and out of operative engagement with the grinding wheel. The slide 1041 is mounted for rectilinear adjustment upon a ring member 1035 which in turn is angularly adjustable on the flange portion 1029 of a sleeve member 721 (Fig. 3) which is secured to tool carrier 28. The rectilinear adjustment of slide 1041 serves to permit control of the profile shapes dressed on the inside and outside surfaces of the grinding wheel, as described in the Barker et al. application, while the angular adjustment of ring member 1035 permits of positioning the dressing mechanism at a point around the wheel where it will not interfere with the work when the wheel is in grinding engagement with the work. The spring-pressed detent 1036, which may be engaged selectively in any one of a series of holes 1037, that are spaced angularly around the periphery of the flange 1029, serves to hold the ring member 1035 in any adjusted position.

The bracket 1075 is swung about the hinge pin 1051, to move the side-dressers into and out of operative relation with the grinding wheel, by application of fluid pressure to one or the other end of a piston (not shown) which is mounted, as described in the Barker et al. application, to reciprocate in a cylinder 1126 (Fig. 4) that is carried by slide 1041. The side-dressers are actuated when in dressing position, to effect dressing of the outside and inside surfaces of the grinding wheel, respectively, by reciprocation of the piston 1102 (Fig. 5) which is provided on opposite sides with rack teeth 1100 and 1101 that mesh with the teeth of gears 1098 and 1099, respectively, that are secured to the shafts 1090 and 1091.

The tip-dressing tool 1145 (Fig. 4) is mounted in an arm 1146 that is oscillated by a piston (not shown) which is mounted to reciprocate in a cylinder 1152. The oscillation of the arm 1146 serves, when the tip-dressing tool is in operative engagement with the wheel, to swing the dresser 1145 from one side of the wheel to the other to dress the tip of the wheel. The cylinder 1152 and the end-dresser are swung to and from operative position by a piston (not shown) which reciprocates in the cylinder 1181. The end-dressing unit as a whole is mounted on a slide 1160 which is mounted for rectilinear adjustment on a bracket 1195 that in turn is adjustably mounted on the ring member 1035 as described more particularly in the Barker et al. application. The several adjustments serve to position the tip dresser in accordance with the diameter and height of the grinding wheel and at a point not to interfere with the work when the wheel is in grinding engagement with the work.

Prior to each dressing operation, the grinding wheel is advanced axially in accordance with the amount of stock which is to be removed from the wheel in the ensuing dressing operation. The mechanism for advancing the wheel is of the same nature as that described in the Barker et al. application. It comprises a piston 1266 (Fig. 15) which is mounted to reciprocate in a cylinder 1265 that is mounted on a bracket 730 which is bolted to the cradle 37. The piston 1266 is connected by its piston rod 1267 and a link 1268 with one arm of an oscillatable member 1269 that is mounted to rock on a shaft 1270 (Figs. 15 and 16).

There is a pawl 1271 pivotally mounted on the other arm of the member 1269 and this pawl is adapted to engage a ratchet wheel 1272 that is keyed to the shaft 1270. The pawl 1271 is constantly urged into engagement with the ratchet wheel by a spring-pressed plunger 731 which engages the tail of the pawl and which is mounted in the oscillatable member 1269. Each time that the piston 1266 is moved to the left from the position shown in Fig. 15, then, the ratchet wheel is advanced a step to rotate the shaft 1270 a step.

The shaft 1270, which is journaled in the cradle 37, has a bevel gear 735 keyed to its forward end which meshes with the bevel gear 62 (Fig. 2) of the wheel feed mechanism which from this point on may be identical with that disclosed in the Wildhaber Patent No. 2,252,743. This mechanism includes the bevel gear 62, the shaft 63 to which this gear is secured, the bevel pinion 66 which is integral with this shaft, the bevel gear 67 which is keyed to a shaft 68 (Fig. 3) that is parallel to the shaft 1270, the spur gear 69 which is keyed to the shaft 68, the spur gear 70 which meshes with the gear 69 and which is rotatably mounted on the stud 35, and the spur gear 71 which is keyed to the screw-shaft 72, and a nut 74 into which the shaft 72 threads and which is secured to the sleeve 27.

Figure 15:
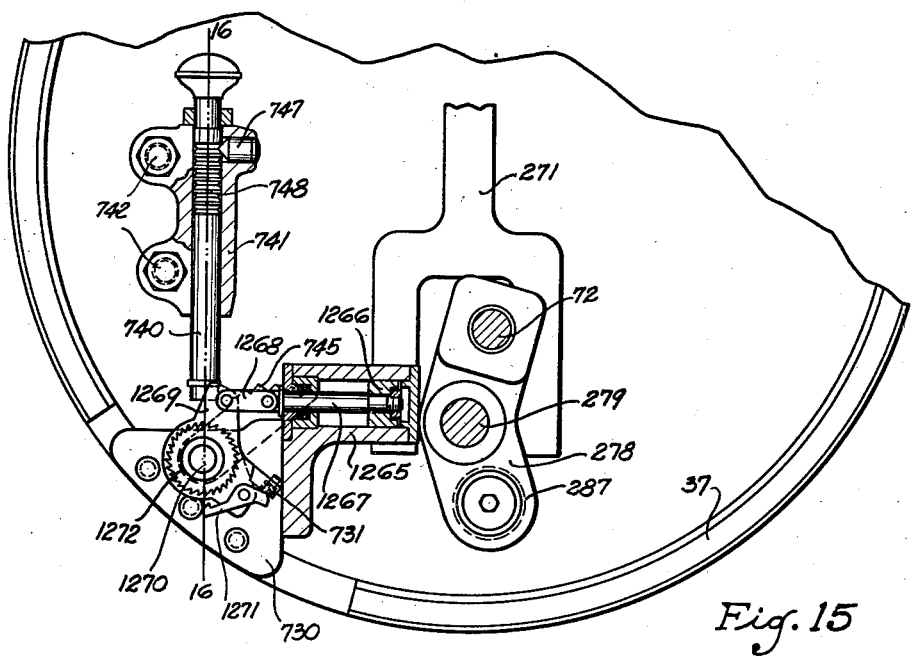
Fig. 15 is a fragmentary view of the cradle, showing in detail the mechanism for controlling the feed of the wheel into the dressing mechanism prior to a dressing operation.
Figure 16:
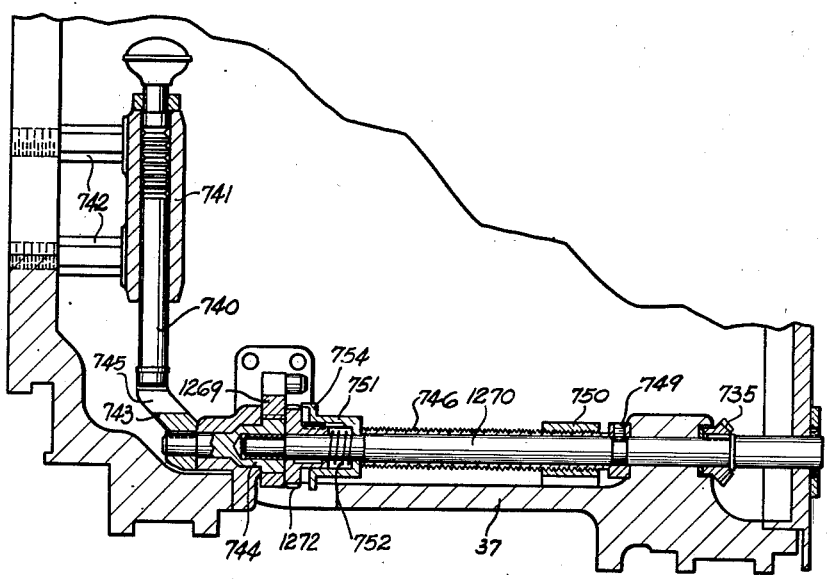
Fig. 16 is a section through this mechanism on the line 16—16 of Fig. 15.

The amount of feed or advance of the wheel on any one actuation of the piston 1266 is variable and is controlled by adjustment of the rod 740 (Figs. 15 and 16). This rod is mounted for slidable adjustment in a bracket 741 which is secured to the cradle 37 by bolts 742. The lower end of this rod is adapted to engage and to limit the movement of an arm 743 which is keyed to a projecting portion of the sleeve member 744 on which the oscillatable member 1269 is mounted. The arm 743 is provided with a plurality of teeth 745. By raising or lowering the rod 740, the rod can be positioned to act as a stop to selectively engage one or other of these teeth 745 to limit the movement of the arm 743 and therefore the amount of feed of the wheel. The rod 740 then may be locked in any adjusted position by a spring-pressed plunger 747 which is housed in the bracket 741 and which is adapted to engage in any one of the series of equally spaced peripheral grooves 748 formed on the rod.

As a safety device to prevent jamming of the feed mechanism, a sleeve 746 is provided. This sleeve is mounted on the shaft 1270 and is secured thereto by a set-screw 749. The sleeve is threaded to engage in a nut 750. This nut is held against rotation relative to the cradle but is free to move axially along the shaft 1270. The nut is adapted to engage a deflector member 751. The deflector member 751 is mounted to be axially movable along the shaft 1270. It is constantly urged in one direction by a coil spring 752 which surrounds the shaft 1270. After the nut has travelled far enough along the shaft 1270 to engage the deflector member 751, it forces the flange portion 754 of the deflector member over the teeth of the ratchet wheel 1272 against the resistance of the spring 752, and thereafter the pawl 1271 simply rides over the flange 754 of the deflector member without actuating the ratchet wheel. Thus feed of the wheel is stopped when the wheel is fed forward as far as it can be with safety.

The valve 700 (Figs. 18 and 25) controls the operation of the wheel-feed mechanism as well as the movements of the side and tip-dressers into and out of operative position. This valve is mounted to reciprocate in a sleeve 760 which is secured in the casting 710. The valve is constantly urged in one direction by the coil spring 761 which is mounted in a hole drilled into one end of the valve and which seats at one end against the plug 762 that threads into the cover plate 763 of the casting 710. The valve has a headed contact member 764 adjustably threaded into its opposite end and this headed contact member engages the rear face of arm 719. This arm, as already described, carries a button or follower on its front face which engages the peripheral surface of cam 692, and is pivotally mounted on rod 707. Thus, reciprocation of valve 700 is controlled by cam 692.

The valve 701, which controls the movements of the dressing tools, when in operative position, is mounted to reciprocate in a sleeve 765 which is secured in casting 710. It is constantly urged in one direction by the coil spring 766. This spring is mounted in a hole drilled into one end of the valve and seats at one end against a plug 767 which threads into the cover plate 763 of casting 710. The valve has a contact member 768 adjustably threaded into its opposite end which engages the rear face of arm 720. This arm, as already described, carries a button or follower on its front face which engages the peripheral surface of cam 693, and is pivotally mounted on rod 707. Thus, reciprocation of valve 701 is controlled by cam 693.

The two valves 700 and 701 take the place of the rotary hand-operated valve 220 of the Barker et al. application, and the fluid-pressure operated parts, which are controlled by these valves, may be connected to these valves in the same way as the dresser carriers and dressing mechanisms, respectively, are connected to the valve 220 in the Barker et al. application.

The sleeve 760 is provided with five series of radially arranged ports designated 782, 783, 784, 785, and 786, respectively, while the sleeve 765 is also provided with five series of radially arranged ports which are designated 792, 793, 794, 795, and 796, respectively.

The valve 700 is connected with each of the pistons, which reciprocate in the cylinders 1126 and 1181 (Fig. 4), and with the piston 1266 (Fig. 15), which reciprocates in the cylinder 1265, through ducts 1255 and 1275 (Fig. 25). These ducts communicate, respectively, with opposite ends of these several cylinders through any suitable connections as, for instance, in the same way as the control valve 220 of the Barker et al. application connects with the corresponding cylinders of that application. The valve 701 is connected to the piston 1102 (Fig. 5), which actuates the side-dressers, and to the piston, which reciprocates in the cylinder 1152 and actuates the end-dresser, through ducts 1280 and 1281 (Fig. 25) which are connected respectively, with opposite ends of these cylinders in any suitable manner, as, for instance, in the way in which the control valve 220 of the Barker et al. application is connected with the corresponding cylinders of that application.

In dressing the sides of a grinding wheel with either the mechanism of the present application or the dressing mechanism of the Barker et al. application, the side-dressing tools are first swung rapidly in one direction and then slowly in the opposite direction. The rate of the slow return movement determines the fineness of finish which may be dressed on the sides of the wheel.

In the dressing mechanism of the Barker et al. application there is a manually adjustable needle valve which governs the rate of return movement of the side-dressers. After rough-grinding is finished, this needle valve has to be adjusted manually to slow down the rate of return dressing so that the wheel can be dressed with a finish suitable for finish-grinding. In the present machine the change in rate of dressing is made automatically. For the single needle valve controlling the rate of return movement of the side-dresser arms, there are substituted two needle valves which are adjustable independently of one another and which are adjusted prior to the starting of the machine. One of these needle valves controls the rate of return dressing movement of the side-dressers for dressing prior to rough-grinding operations, while the other needle valve controls the rate of return movement of the side-dressers for dressing prior to the finish-grinding operation. A selector valve determines which is operable at a given time. The two needle valves are denoted at 770 and 771, respectively, (Figs. 20 and 25). The selector valve is designated 772 (Figs. 18, 20, 24, and 25). The needle valves 770 and 771 are identical and of standard construction. Each is adjustably threaded into a sleeve that is mounted in the casting 710. The sleeves are denoted at 774 and 775, respectively. The selector valve 772 is mounted to reciprocate in the sleeve 776. It is constantly urged in one direction by a coil spring 777 and is moved in the opposite direction against the resistance of the spring by a solenoid 778 when that solenoid is energized, as will be described more particularly hereinafter. The sleeve 776 is secured in the casting 710 and is provided with three series of radial ports denoted at 789, 790, and 791, respectively.

In the positions of the several valves 700, 701, and 772 shown in the drawings, the pressure fluid flows from the pressure line 471 into pressure line 780 and thence through the ports 794 of sleeve 765, duct 781 formed in casting 710, and ports 784 and 783 of sleeve 760 into line 1275. This line leads through suitable ducts, such as shown in the Barker et al. application, to one side of each of the pistons which operate in the cylinders 1126 and 1181 (Fig. 4) and to one side of the feed piston 1266 (Fig. 15) which operates in cylinder 1265. Pressure in this line swings the side and end-dressing mechanisms into operative relation with the grinding wheel or causes them to be held in such relation, and it advances the grinding wheel axially in accordance with the amount of stock to be removed in the ensuing dressing operation, or causes the wheel to be held in such advanced position. At the same time that the line 1275 is on supply, the line 1255, which is connected with the opposite end of these same cylinders 1126, 1181, and 1265, is on exhaust through the ports 785 and 786 of sleeve 760, the duct 787 formed in casting 710, the ports 796 of sleeve 765, and the duct 788 which leads back to the sump of the machine. At this time, also, the line 1281 is on supply from the pressure line 780 through the ports 794 and 795 of sleeve 765, and the line 1280 is on exhaust through the ports 793 and 792 of the sleeve 765, the duct 797, the ports 790 and 791 of selector valve sleeve 776, the duct 798, the needle valve 770, the duct 799, the ports 796 of the sleeve 765 and the line 788 which leads back to the sump.

The position of valve 701 shown is the position which this valve occupies during the return stroke of the side and end-dressers and at the end of the return stroke. In this position, and with the selector valve 772 in the position shown, the needle valve 770 controls the rate of movement of the side-dressers.

Now, each time that one of the buttons 631 (Fig. 14) carried by the rotatable stop-plate 560 engages the rocker-arm 632 in an indexing rotation of the stop-plate, the normally-open limit switch 635 is closed. This limit switch is connected electrically with the solenoid 778 (Fig. 25) so that when the limit switch is closed, the solenoid is energized. If a button 631 is so positioned on the stop-plate 560 that it just passes over the rocker-arm 632 in the indexing movement of the stop-plate, nothing happens for the solenoid 778 is not energized long enough for the valve 772 to be shifted, but if a button 631 is so positioned on stop-plate 560 that the stop-plate stops at the end of an indexing movement with the button engaging the rocker-arm 632, then the limit switch 635 is held closed and the selector valve 772 is shifted. This puts the needle valve 771, instead of the needle valve 770, in control of the rate of return movement of the side and end-dressers, for with the selector valve 772 shifted from the position shown in Fig. 25, the motive fluid exhausting from the line 1280 will flow through the ports 793 and 792 of sleeve 765, the duct 797 of casting 710, the ports 790 and 789 of sleeve 776, the duct 816 of casting 710, the needle valve 771, the ducts 817, 818 and 787 of casting 710, and the ports 796 of sleeve 765 into the duct 788 which leads back to the sump of the machine. Thus, if the throttle valve 771 has been adjusted to throttle more finely the exhaust from line 1280, the rate of return movement of the side and end-dressers can be slowed down to effect finish-dressing of the grinding wheel, when the selector valve 772 is shifted.

Since it takes longer to dress the wheel in a finish-dressing operation than in a rough-dressing operation and since, in general, with different jobs and different types of grinding wheels, different periods of time will be required to dress the wheels, it has been found desirable to provide means for stopping and restarting the dressing cycle motor 640 (Fig. 17) during a dressing cycle on both forward and return strokes of the dressing tools so as to allow time for completion of each dressing movement regardless of the rate of the movement. The motor 640 can be stopped during actual dressing because the dressing mechanism itself is fluid-pressure operated and once the valve 701 (Fig. 18) has been shifted by the cam 693 to determine the direction of movement of the dressing tools, the tools will be carried on to the ends of their strokes by fluid-pressure. Reversal of the direction of movement of the dressing tools, however, requires that the motor 640 be restarted to drive cam 693 on to reverse valve 701, but again, once reversal of the valve has been effected, the dressing operation itself can be completed without necessarily actuating motor 640.

For the purpose of stopping and restarting motor 640 during a dressing cycle, a normally-closed limit switch 663 (Figs. 5 and 6) is provided. This limit switch is incorporated in the electrical circuit to the motor 640, as will be hereinafter described. The limit switch is mounted on the end-plate 1109 of dresser housing 1075. It is adapted to be operated by a cam 725 which is secured to the projecting end of a plunger 1112 which is mounted within a bore of the shaft 1090 that carries the outside dresser arm 1092. The plunger has an enlarged head 1112 that is fastened to the shaft 1090 to rotate with the shaft. The cam 725 is formed as shown in Fig. 6. It has a peripheral surface which, for the greater part of its extent, is an arcuate surface coaxial with shaft 1090, but this surface has depressions 726 formed in it at its opposite ends. The cam engages with a button or follower 727 that is carried by an arm 728 which is oscillatably mounted on a stud 729 that threads into the end plate 1109. The arm 728 engages the plunger of the limit switch 663.

When the follower 727 is in one of the depressions 726 of the cam, the limit switch 663 is closed but when the follower is riding on the arcuate portion of the cam surface, the limit switch is open. As the outside dresser arm 1092 swings, then, in each direction, the follower 727 rides up out of the depression 726 with which it has previously been engaged, and the limit switch 663 is opened to stop the motor 640. The motor is stopped, therefore, on each stroke during the whole swing of the dresser arms and is restarted again only at the ends of the strokes when the follower 727 has again dropped into one of the depressions 726.

The operation of the machine proceeds with alternate grinding cycles and cycles of feed of the work and, when desired, dressing of the wheel, until after the finish-grinding cycle has been completed. Then, as after each grinding cycle, the sliding base 224 (Fig. 1) is withdrawn to disengage the plunger 570 (Fig. 10) from the positive stop 574, and the stop-plate 560 is indexed. In this final indexing movement of the stop-plate, however, a button 820 (Fig. 14), which is mounted on the stop-plate, is indexed into position to engage and rock a lever 821 which is pivotally mounted in the bracket 565 (Fig. 12) on the stud 633 alongside the lever 632. This lever 821 has a finger 822 (Fig. 14) projecting from one side which is adapted to engage one end of a rod 823 that is slidably mounted in the bracket 565. The opposite end of this rod engages a limit switch 502. This limit switch is so connected in the electrical circuit of the machine, as will be described hereinafter, that when it is tripped, the circuits to the wheel motor 80, main drive motor 90, and cycle motor 640 are all broken, and only the pump motor 472 can continue to run.

The work having been completed, the operator unclamps the work and rotates the valve 488 to put the ducts 486 and 586 (Fig. 25) on supply and the ducts 585 and 485 on exhaust. The pressure fluid flowing from the duct 586 enters the ducts 595 and 559 through the ports 495 of sleeve 558, the groove 490 of valve 555, the duct 493 and grooves 492 of this valve, and the ports 498 of sleeve 558. This causes piston 550 to move from the position shown in Fig. 9 to the position shown in Fig. 25, withdrawing the sliding base and workhead to loading position. The pressure fluid flowing from duct 486 enters the duct 825 which communicates with one end of a piston 826 (Figs. 10, 11, 13 and 25) and through a duct 827 with one end of a piston 828. The pistons 826 and 828 are mounted for reciprocation in the bracket part 566 in parallelism to the piston 580.

Figure 11:
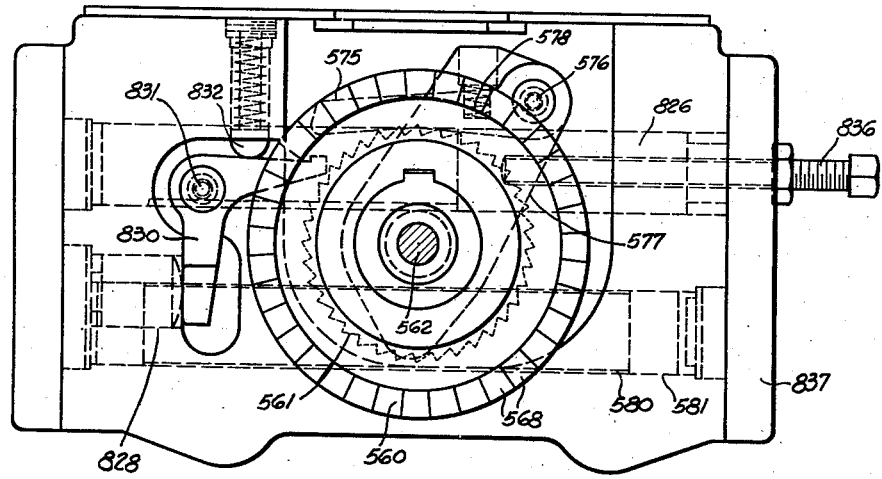
Fig. 11 is a sectional view through the variable stop mechanism taken on the line 11—11 of Fig. 10 and looking in the direction of the arrows.

The piston 828 is adapted to engage one arm of a trip dog 830 which is pivotally mounted at 831 in the bracket 566 and which is normally held in the position shown in Fig. 11 by pressure of the spring-pressed plunger 832 on its other arm. When fluid pressure is applied to the piston 828, however, the trip dog 830 is rocked about its pivot 831 against the resistance of the spring-pressed plunger 832. At this time, the rocker-arm 577 is at the left from the position shown in Fig. 11 at the end of its movement under actuation of piston 580, so that the trip dog 830 will engage pawl 575 and disengage this pawl from ratchet wheel 561 against resistance of spring 578.

Simultaneously with the disengagement of the pawl 575 from ratchet wheel 561, the pressure fluid flowing into duct 595, moves the piston 580 back to starting position to return rocker-arm 577 and the now disengaged pawl 575 to starting position.

The piston 826 is provided with rack teeth 834 which mesh with teeth 835 of a spur pinion that is cut into the periphery of shaft 562. Hence, when the pressure of the motive fluid is applied to the piston 826, the shaft 562 is rotated back to reset the stop-plate 560. The distance which the piston 826 may move in this resetting movement is determined by adjustment of the stop-screw 836 that is threaded into the side plate 837 of housing part 566. Initial adjustment of this screw predetermines, therefore, the original setting of stop-plate 560, that is, the number of step-by-step feed advances of the sliding base 224 in the operation of grinding a gear. This adjustment can be made precisely by use of a pointer 838 (Fig. 10) which is secured in the housing part 565 and which reads against the numerals by which the different steps 568 of the stop-plate are designated. These numerals are shown in Fig. 14 and are provided on the periphery of the stop-plate 560.

The pressure fluid flowing through the line 486 forces the piston 482 forward in cylinder 480 releasing the work. The completed gear can now be taken off the machine and a new workpiece chucked thereon.

One way in which the machine may be wired electrically to accomplish the desired functions is illustrated diagrammatically in Fig. 26.

A manual starter 466 of any standard or suitable construction is provided at some convenient point on the machine. When this starter is closed, a circuit is made from the main lines $L_1$, $L_2$, $L_3$ to the pump motor 472 through this starter and the lines 467, 468, and 469. This starts the pump motor 472 which must be started before any of the rest of the machine can be put into operation.

When the pump motor 472 has been started, fluid pressure will be available, and the operator can chuck the work, and bring the work head and sliding base into operative position by manipulation of the valve 488 (Fig. 25). With the pump motor 472 started, the operator can also start the wheel motor 90.

A normally-open starter button 500 is also provided at some convenient point on the machine. When this starter button is pressed in, a circuit is closed from the main line $L_1$ through the line 501, the final stop limit switch 502 (Figs. 14 and 26), the line 503, the normally closed stop button 504, the line 506, the starter button 500, the line 507, the coil 508 of a standard controller 505, the line 509, the manual starter 466, and the line 468 to the main line $L_2$. This energizes the coil 508 and pulls in the switch arms 510, 511, 512, and 513 of controller 505, thereby closing the circuit from the main lines $L_1$, $L_2$, and $L_3$ to the wheel drive motor 80, starting this motor. When the starter button 500 is released, it opens, but the circuit to the motor is maintained from the line $L_1$ through the line 501, the switch 502, the line 503, the stop button 504, the line 515, the switch arm 513, the line 516, the coil 508, the line 509, the manual starter 466, the line 468, and the main line $L_2$.

With the wheel motor 80 running and the work in operative relation with the grinding wheel, the operator may start the main drive motor 90. Mounted also at a convenient spot on the machine is a starter button 520, which is used to start the main drive motor 90. Pressing in this starter button 520 closes a circuit from the main line $L_1$ through the line 501, switch 502, line 503, stop button 504, line 515, switch arm 513, line 507, line 521, line 522, starter button 520, line 523, line 524, coil 525 of a standard controller 526, line 527, switch arm 528 of a standard mechanical latched-in relay 530, line 531, line 532, line 533, and line 534 to the main line $L_2$. This energizes the coil 525 and pulls in the switch arms 535, 536, 537, and 538 of controller 526. The circuit to the motor 90 is maintained, then, after release and opening of the starter button 520, from the main line $L_1$ through the line 501, switch 502, line 503, normally-closed stop button 504, line 515, switch arm 513, line 507, line 521, line 522, line 540, normally-closed stop button 541, line 542, switch arm 538, line 524, coil 525, line 527, switch arm 528, line 531, line 532, line 533, line 534, and main line $L_2$.

The automatic stop mechanism 590 of the machine is initially adjusted to trip after a number of grinding cycles equal to the number of teeth in the gear to be ground. The switch arm 592 of this mechanism 590 is normally closed, closing a circuit from the main line $L_1$ through the line 501, the final-stop switch 502, the line 600, the switch arm 592, the line 601, the coil 593 of a standard relay 604, the line 602, and the line 534 back to the main line $L_2$. Thus, the coil 593 is energized and holds the switch arm 605 open in the position shown in Fig. 26.

With the wheel motor 80 and the main drive motor 90 running, the machine goes through its generating cycles. In each, the rotating wheel is fed into the rotating work-piece; the cradle is swung in one direction to generate-grind a tooth surface of the work; the wheel is withdrawn from operative position; the cradle is swung back to original position; and during this return swing of the cradle, the continued rotation of the work indexes the work so that as a new generating cycle begins a new tooth surface of the work is in position to be ground. After a generating operation on each tooth of the work, a grinding cycle is completed and the automatic stop mechanism 590 of the machine is tripped.

When the automatic stop mechanism 590 is tripped, the switch arm 592 is opened, breaking the circuit to the coil 593, allowing the switch arm 605 to drop over and make contact with the terminal 606 of the relay 604. This closes a circuit to the motor 610 and coil 611 of a standard timer 591, the circuit being made from the main line $L_1$ through the line 501, the final-stop switch 502, the line 503, the normally-closed stop button 504, the line 515, the switch arm 513, the line 507, the line 521, the lines 612, 613, and 614 to the coil 611 and the lines 608 and 609 to the motor 610, the line 615, the switch arm 605, the line 616, the line 602, and the line 534 back to the main line $L_2$. The now-energized coil 611 closes the switch arms 617 and 618 of the timer 591. This closes a circuit to the solenoid 557, energizing this solenoid and shifting the valve 555 (Fig. 25), as already described, against the resistance of the spring 556. The circuit to the solenoid 557 is from the main line $L_1$ (Fig. 26) through the line 501, the switch 502, the line 503, the normally-closed stop button 504, the line 515, the switch 513, the line 507, the line 521, the line 612, the line 620, the solenoid 557, the line 621, the switch arm 618, the line 622, and the line 534, to the main line $L_2$.

The automatic stop switch 592 is a normally-closed switch and is, therefore, opened only momentarily when the automatic stop mechanism is tripped. When this switch 592 closes again, reenergizing the coil 593 to pull the switch arm 605 back to the position shown in the Fig. 26, the circuit to the motor 610 and the coil 611 of the timer 591 is maintained for as long as the timer is in operation through the switch arm 617, the circuit being from the line $L_1$ through the line 501, switch 502, line 503, button 504, line 515, switch 513, line 507, line 521, lines 512, 613, and 614 to coil 611 and lines 608 and 609 to motor 610, line 624, switch arm 617, line 625, line 622, and line 534 back to main line $L_2$.

When the solenoid 557 is energized as just described, the reversing valve 555 is shifted from the position shown in Fig. 25 against the resistance of spring 556. This puts the ducts 559 and 595 on supply, causing the sliding base 224 to be withdrawn far enough to disengage the pin 573 from the stop button 574 (Fig. 10) and causing the arm 577 and pawl 575 (Fig. 11) to be rotated to advance the ratchet wheel 561 and stop-plate 560.

After the timer 591 has run a definite preselected period determined by its initial setting, a cam or other mechanism in the timer driven by the motor 610 opens the switch arms 617 and 618, breaking their circuit to the solenoid 557 and allowing the valve 555 to be shifted back to the position shown in Fig. 25 by the spring 556. This puts the line 499 to the cylinder 551 back on supply and the line 559 on exhaust, causing the sliding base 224 to be returned to operative position with a new land of the stop-plate 560 (Fig. 10) in engagement with the bar 570 and determining the depth to which the work will be engaged with the grinding wheel in the ensuing grinding cycle.

The sliding base 224 only has to be withdrawn a slight distance from operative position in order that the bar 570 (Fig. 10) clear the positive stop 574, and it takes only a fraction of a second to index the stop-plate 560 (Figs. 10 and 14). In fact, the whole operation of withdrawing the sliding base slightly from operative position, indexing the stop-plate 560, and returning the sliding base into operative position again can be performed during a return roll of the cradle, and so can be performed during the return roll of the cradle at the end of a grinding cycle. Hence, the timer 591 (Fig. 26) is adjusted to perform its function in less than the time required for a return roll of the cradle.

If, in the indexing movement of the stop-plate 560, none of the buttons 631 (Figs. 10 and 14) comes into engagement with the arm 632, the limit switch 635 is not tripped and the wheel is not dressed. In this case, then, after the sliding base is returned into operative position, the grinding operation is resumed at the end of the return roll, and the grinding wheel grinds into the work in the new grinding cycle at the new depth determined by that new land 568 of the stop-plate which is in engagement with bar 570.

If, on the other hand, in the indexing movement of the stop-plate, one of the buttons 631 comes into engagement with the arm 632, then the main drive motor 90 is stopped and the dressing-cycle motor 640 is started. The way in which this happens will now be described.

When one of the buttons 631 comes into engagement with the arm 632, the arm 638 of switch 635 is moved from its grinding position, in which it bridges the terminals 641 and 642 (Fig. 26), to a position in which it bridges the terminals 660 and 661. This causes a circuit to be made from the main line $L_1$ through the line 501, switch 502, line 503, stop-button 504, line 515, switch arm 513, line 507, line 648, line 810, switch arm 638, line 813, switch arm 647, line 814, coil 809, and lines 533 and 534 to main line $L_2$. This energizes coil 809, causing the switch arms 528 and 529 of mechanical latched relay 530 to be pulled open and switch arm 812 of this relay to be pulled closed.

The opening of switch arm 528 breaks the circuit to coil 525 of controller 526, stopping main drive motor 90. The closing of switch arm 812, closes a circuit from main line $L_2$ through lines 545 and 673, coil 670, line 818, switch arm 812, line 805, switch 475, line 800, switch arm 664 of switch 663 (Figs. 5 and 6), lines 662, 612, 521, and 507, switch arm 513, line 515, stop button 504, line 503, switch 502, and line 501 to main line $L_1$. Thus coil 670 is energized, pulling in arms 675, 676, and 677 of controller 672 and starting cycle motor 640.

It will be noted that this circuit to coil 670 and cycle motor 640 cannot be closed unless the switch 475 is closed. This is the switch (Figs. 7 and 8) which is controlled by the in and out axial movement of the grinding wheel, and it is only closed when the wheel is in withdrawn position. Hence, the cycle motor 640 cannot be started unless the grinding wheel is in withdrawn position. This switch, therefore, insures that the wheel is always withdrawn when dressed, which insures that the proper amount of stock is taken off the wheel in each dressing operation.

It will be noted, also, that the circuit to coil 670 and cycle motor 640 can only be closed if switch arm 664 is in the position shown in Fig. 26, connecting lines 662 and 800. This is the position of switch arm 664 at the end of the stroke of outside dresser arm 1092, when the follower 707 (Figs. 5 and 6) is in a depression 726 of cam 725.

Now when switch arm 638 is moved to close the circuit to the coil 670 and motor 640 as above described, it also closes a circuit to solenoid 778, energizing this solenoid. This circuit is from main line $L_1$ through the line 501, switch 502, line 503, stop button 504, line 515, switch arm 513, line 507, line 648, line 810, switch arm 638, line 811, solenoid 778, and line 534 back to main line $L_2$. If a button 631 of stop-plate 560 makes only momentary contact with lever arm 632 (Fig. 14) and then passes on, in the indexing of stop-plate 560, the switch arm 638 returns to the position shown in Fig. 26 and the solenoid 778 is not energized long enough to shift selector valve 772 (Figs. 18, 20, 24, and 25). Therefore, the needle valve 770 will control the rate of dressing on the ensuing dressing cycle. If the indexing of stop-plate 560 ends with button 631 in engagement with lever arm 632, however, then the switch arm 638 will be held in position where it bridges terminals 660 and 661, and solenoid 778 will be energized long enough to shift selector valve 772 with the result that needle valve 771 will control the ensuing dressing operation and the wheel will be finish dressed.

Regardless of whether the selector valve 772 is shifted or not, as soon as the cycle motor 640 starts running, the contact member 713 (Fig. 18) of lever arm 715 drops off of the lug 697 of cam 691 (Figs. 18 and 21), allowing the hitherto open switch 666 to close. This maintains the circuit to coil 670 of controller 672 from main line $L_2$ through line 545, line 673, coil 670, line 669, switch 668, line 665, switch 664, lines 662, 612, 521, and 507, switch arm 513, line 515, stop button 504, line 503, switch 502, and line 501 to main line $L_1$. Thus, the dressing cycle motor can run to the full end of the dressing cycle even though the switch arm 812 be opened during the cycle as hereinafter described.

As the shaft 690 continues to revolve under actuation of cycle motor 640, the contact lug on arm 719 (Fig. 18) rides up on lobe 803 (Fig. 22) of cam 692, and valve 700 is shifted against resistance of spring 761, causing the side and end-dressers to be swung into operative engagement with the grinding wheel. Then the contact lug on arm 720 (Fig. 18) rides up on lobe 804 (Fig. 23) of cam 693 and this valve is shifted against resistance of spring 766, causing the side and end dressers to be swung in one direction across the side and tip surfaces of the grinding wheel. Then the contact lug on arm 720 rides down off the high part 804 of cam 693, allowing the spring 766 to shift the valve 701 back, causing the side and end dressers to be swung back over the sides and tip of the wheel. This completes the actual dressing of the wheel.

In the swing of the outside dresser arm 1092 in both directions, the follower 727 (Figs. 5 and 6) rides up on the high part of cam 725, causing the dresser bracket limit switch 663 to break connection between the lines 800 and 662, and make connection between the lines 662 and 801. When the switch arm 664 breaks connection between the lines 800 and 662, the circuit to the coil 670 through the switch 668 and line 669 is broken as is also the circuit to this coil 670 through the switch arm 812 and line 818. This deenergizes coil 670 and stops cycle motor 640.

This does not affect the dressing operation because the pump motor 472 continues to run and the fluid-pressure operated pistons, which actuate the dressing mechanisms, continue, therefore, to perform their functions. The cycle motor 640 is simply stopped to allow enough interval of time to complete the dressing operation regardless of the type of gear being ground and the fineness to which the wheel is being dressed. When the rider 727 drops again into a depression 726 of the cam 725, it closes the circuit to the coil 670 again from the main line $L_1$ through the line 501, the switch 502, the line 503, the stop button 504, the line 515, the switch 513, the line 507, the line 521, the line 612, the line 662, the switch 664, the line 665, the switch 668, the line 669, the coil 670, the line 673, and the line 545 back to the main line $L_2$. This restarts the motor 640.

When the switch arm 664 closes the connection between the line 662 and the line 801, the coil 802 is energized to pull the switch arm 647 open. The circuit to the coil 802 is made from the main line $L_1$ through the line 501, switch 502, the line 503, the stop button 504, the line 515, the switch arm 513, the line 507, the line 521, the line 612, the line 662, the switch arm 664, the line 801, the coil 802, the line 650, the line 532, the line 533, and the line 534 to the main line $L_2$. The opening of the switch arm 647 breaks the circuit to the coil 809 of mechanical latched relay 530.

As the shaft 690 continues to rotate under actuation of cycle motor 640, the contact lug on lever arm 719 (Fig. 18) rides down off the lobe 803 of cam 692, permitting valve 700 to be shifted by spring 761, causing the side and end dressers to be swung out of operative position.

In the further rotation of the shaft 690 (Fig. 18), the contact member 712 of arm 706 rides up on the lobe 698 of cam 691. This closes a circuit to the coil 651 of mechanical latched relay 530 (Fig. 23). This circuit is from the main line L1 through the line 501, the switch 502, the line 503, the stop button 504, the line 515, the switch arm 513, the line 507, the line 521, the line 522, the line 656, the switch 655, the line 652, the coil 651, and the lines 532, 533 and 534 to the main line L2. This energizes the coil 651, causing the switch arms 512, 528 and 529 to be moved to the positions shown in Fig. 23. This causes a circuit to be made to coil 525 of controller 526 from main line L1 through line 501, switch 502, line 503, stop button 504, line 515, switch arm 513, line 507, line 521, line 522, line 656, switch 655, line 652, line 808, switch arm 529, line 819, line 524, coil 525, line 527, switch arm 528, line 531, line 532, line 533, and line 534 to main line L2. This closes switch arms 535, 536, 537 and 538, restarting main drive motor 90. The cradle goes on to complete its return roll and then a new generating cycle is started.

The dresser cycle motor 640 is not stopped immediately on starting of the main drive motor 90, but continues to run until the shaft 690 has made a complete revolution. In the further rotation of the shaft 690, the contact member 712 (Fig. 18) rides down off the lobe 698 of cam 691, allowing the switch 655 to open. The circuit to coil 525 and main drive motor 90 is maintained now, however, from main line L1 through line 501, switch 502, line 503, stop button 504, line 515, switch arm 513, line 507, line 521, line 522, line 540, stop button 541, line 542, switch arm 538, line 524, coil 525, line 527, switch arm 528, lines 531, 532, 533, and 534 to main line L2.

Just at the end of a revolution of shaft 690, the lug 697 of cam 691 trips the limit switch 666 to open said switch. This breaks the circuit to the coil 670 and stops the cycle motor 640.

The alternate operations of grinding and step-by-step advance of the stop-plate 560, with dressing of the wheel where fore-ordained by the positioning of the buttons 631, will continue until the button 820 (Fig. 14), which is mounted in the stop-plate, is indexed into engagement with the lever 821 to trip limit switch 502. This breaks the circuits to coils 508, 525 and 670 of controllers 505, 526 and 672, stopping wheel motor 80, main drive motor 90 and cycle motor 640. Only the pump motor 472 continues to run. The operator then moves the control valve 488 (Fig. 25) to withdraw the sliding base 224 to full out position, dechuck the work, move the pawl 575 (Fig. 13) out of engagement with the ratchet wheel 561, and reset the stop-plate 560 as already described. When the sliding base reaches loading position, the completed gear can be removed from the machine and a new work-piece chucked thereon. Then the new work-piece can be chucked, the sliding base moved back into operative position, and the motors restarted, all as already described.

The operation of the machine will be understood from the preceding description, but may be summed up briefly here.

After the operator has made all of the necessary adjustments in the machine and placed the gear, which is to be ground, on the work spindle, he starts the pump motor 472 by closing manual starter 466 (Fig. 26). With fluid-pressure available, the operator then rotates valve 488 (Fig. 25) to put line 485, and lines 585 and 499 on supply and to put line 486 and lines 559 and 586 on exhaust. This causes the work to be chucked and the sliding base 224 to be moved forward into operating position. The wheel motor 80 can also be started by pressing in starter button 500 (Fig. 26). Then the main drive motor 90 can be started by pressing in starter button 520.

The machine now goes through a grinding cycle consisting of as many generating cycles as there are teeth in the gear to be ground. In each generating cycle, the rotating grinding wheel is first fed into the work through operation of feed cam 264 (Fig. 3) and the parts which connect that cam with sleeve 27 in which the grinding wheel spindle is journaled; then the rotating wheel is rolled in one direction with the rotating work-piece through oscillation of cradle 37 in one direction; then the wheel is withdrawn from engagement with the work by operation of spring 285 and feed cam 264; and then the cradle is rocked back to its initial position by operation of cam 130. During the return roll of the cradle, the continued rotation of the work indexes the work.

During each generating roll, a friction load is applied to the cradle, to eliminate all effect of backlash in the cradle drive, by application of fluid-pressure to the brake-pistons 455 (Figs. 3 and 25) through movement of valve 457 (Figs. 7, 8, and 25) by feed cam 264. At the beginning of each return roll, at the same time that the grinding wheel is withdrawn from operating position, the valve 457 is reversed by feed cam 264 and the brake-load on the cradle is released. At this time, however, the limit switch 475 (Figs. 7, 8, and 26) is closed. This is the limit switch which must be closed in order to start dressing cycle motor 640.

When the machine has performed as many generating cycles as there are teeth in the gear to be ground, the automatic stop mechanism 590 (Fig. 26) of the machine is tripped by cam 350 (Fig. 3) starting timer 591 and energizing solenoid 557. The latter then shifts valve 555 (Fig. 25) to put duct 559 on supply from duct 585 and duct 499 on exhaust through duct 586. This causes the piston 550 (Figs. 9 and 25) to withdraw sliding base 224 from operative position, and it causes piston 580 (Figs. 10, 11, 14 and 25) to index stop-plate 560 one step through operation of pawl 575 and ratchet wheel 561. When the timer has run for the period of time for which it has been adjusted, the solenoid 557 is deenergized, and the valve 555 is reversed through operation of spring 556 (Fig. 25). The sliding base 224 then returns to operative position with the new land 568 of stop-plate 560, which has been indexed into operative position, engaging bar 570 (Fig. 10) and through pin 573 and positive stop 574 limiting the depth of engagement of the work with the grinding wheel.

The sliding base can be withdrawn, the stop-plate 560 indexed, and the sliding base returned to operative position in less than the time required for the return roll of the cradle. Hence, if no button 631 of stop-plate 560 passes over the nose 636 (Fig. 12) of lever 632 in the indexing of the stop-plate, the grinding operation on the work is resumed with the wheel grinding at the new depth in a new grinding cycle.

If, however, one of the buttons 631 engages lever 632 in the indexing of the stop-plate, limit switch 635 (Figs. 12 and 26) is tripped, breaking the circuit to main drive motor 90 and stopping this motor. This stops the generating operations of the machine but the wheel continues to rotate. At the same time that motor 90 is stopped, a circuit is made to dressing cycle motor 640, starting the latter motor. This drives shaft 690 which carries cams 691, 692 and 693 (Figs. 18, 21, 22 and 23).

As this shaft revolves, valve 700 is shifted to put duct 1275 (Fig. 25) on supply from ducts 781, 780, and 471 and to put duct 1255 on exhaust through ducts 787 and 788. The pistons in cylinders 1126 and 1181 (Figs. 4 and 15) are therefore moved to carry the side and end-dressing mechanisms of the machine into operative engagement with the grinding wheel, and the piston 1266 in cylinder 1265 is simultaneously moved to actuate pawl 1271 and ratchet wheel 1272 and through gears 735 (Fig. 16), 62 (Fig. 2), 66, 67, 69 (Fig. 3), 70, 71 and screw shaft 72 advances the now-withdrawn grinding wheel axially by the amount of stock which it is desired to dress off the wheel in the ensuing dressing operation.

As soon as all this has been accomplished, cam 693 on shaft 690 (Figs. 18 and 23) causes valve 701 to be shifted to put duct 1280 (Fig. 25) on supply from ducts 780 and 471 and duct 1281 on exhaust through duct 788. This causes the side and end dressers (Fig. 4) to be moved in one direction across the sides and tip, respectively, of the grinding wheel to effect dressing of the wheel.

Then in the further rotation of shaft 690 and cam 693 (Figs. 18 and 23) valve 701 is allowed to return to the position shown in Fig. 25 to put line 1281 on supply and line 1280 on exhaust. This causes the side and end dressers to be swung back across the sides and tip, respectively, of the wheel to complete the dressing of the wheel.

The rate of this return dressing movement is determined by the position of selector valve 772 (Figs. 20, 24 and 25) and the position of selector valve 772 is determined by whether stop-plate 560 (Figs. 10, 11, 12 and 14) has stopped in its previous indexing movement with one of its buttons 631 engaging nose 636 of lever 632 or not. If the button 631 has simply passed over nose 636 of lever 632, then solenoid 778 is not energized and exhaust from duct 1280 (Fig. 25) is through ducts 797 and 798, throttle valve 770, and ducts 799 and 788, and is at a relatively fast rate. Thus the wheel is rough-dressed. If, however, at the end of its indexing movement, the stop-plate stops with one of its buttons 631 in engagement with lever 632, then solenoid 778 is energized and exhaust from duct 1280 is through ducts 797, 816, throttle valve 771, and ducts 816, 787 and 788, and is at a relatively slow rate. Thus the wheel is finish-dressed.

In the swing of outside dresser arm 1092 (Figs. 5 and 6) in both directions, whether for rough-dressing or finish-dressing, the follower 727 rides over cam 725, the limit switch 663 (Fig. 26) is opened and the cycle motor is stopped briefly and then restarted again. This insures completion of the dressing operations without interfering with the timing of the machine.

In the further rotation of shaft 690, cam 692 (Fig. 22) allows valve 700 to be shifted by spring 760. This puts duct 1255 (Fig. 25) on supply and duct 1275 on exhaust, causing the side and end-dressing mechanisms to be withdrawn from engagement with the grinding wheel.

Then as shaft 690 rotates still further, cam 691 operates to close limit switch 655 (Figs. 18 and 26) restarting main drive motor 90. The generating mechanism of the machine then completes the return roll of the cradle, which was stopped when the dressing cycle began, and starts a new grinding cycle. Finally, shaft 690 rotates cam 691 into position to trip limit switch 666 and stop cycle motor 640.

The alternate operations of grinding and step-by-step advance of stop-plate 560, with dressing of the grinding wheel after predetermined grinding cycles as determined by the positions of buttons 631, continues until button 820 (Fig. 14) is indexed into engagement with lever 821. Then limit switch 502 (Fig. 26) is tripped to stop motors 80, 90 and 640. The grinding operation is now completed.

The operator then rotates valve 488 (Fig. 25) to put ducts 486 and 586 on supply and duct 485 on exhaust and through valve 555 to put ducts 595 and 559 on supply and ducts 499 and 594 on exhaust. Thus, sliding base 224 is withdrawn to loading position; the work is dechucked; pawl 575 (Figs. 11 and 14) is disengaged from ratchet wheel 561 through operation of piston 828 and trip-dog 830; and stop-plate 560 is reset through operation of piston 826. When the sliding base reaches loading position, the completed gear can be removed and the machine is ready to grind a new work-piece.

While the invention has been described in connection with a machine for grinding longitudinally curved tooth gears with a particular type of grinding wheel and in a particular form of generating operation, it will be understood that the invention may be employed, with suitable modification, for grinding gears of any type with any suitable form of wheel and with or without a generating motion. It will further be understood that the invention in certain aspects as, for instance, the step-by-step depth feed, is applicable to gear cutting machines. In general it may be said that while the invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art and as may be applied to the essential features hereinbefore set forth and as fall within the scope of the invention or the limits of the appended claims.

Having thus described my invention, what I claim is:

1. In a machine for producing gears, a work support, a tool support, a tool mounted on the tool support, means for producing relative rolling movements between the tool and work supports to generate the tooth profiles, separate means for advancing the work relatively into the wheel in the direction of tooth depth, means for periodically effecting separation of tool and work, and means for actuating said depth-controlling means on each separation to advance the tool depthwise into the work.

2. In a machine for grinding gears, a work support, a tool support, a grinding wheel journaled in the tool support, means for rotating the wheel, means for producing movement between the tool and work to effect tooth-forming operations, means controlling the depth of engagement of the tool and work during the tooth-forming operations, said controlling means being so formed that when it is in different positions the wheel will engage the work at different depths, means for periodically effecting separation of the wheel and work and their reengagement again, means for shifting said depth-controlling means on each separation, mechanism for dressing the grinding wheel, and means operable on predetermined shifting movements of the depth-controlling means for actuating said dressing mechanism.

3. In a machine for producing gears, a bed, a slide reciprocable on the bed, a tool support and a work support, one of which is mounted on the slide and the other of which is mounted on the bed, a tool mounted on the tool support, means for producing movements between the tool and work to effect tooth-forming operations, an indexable member and a stop-member cooperating therewith, one of which is mounted on the bed and the other of which is mounted on the slide, said indexable member having a plurality of lands of progressively varying height which are engageable progressively with the stop-member, on indexing of the indexable member, to determine the depth of engagement of the tool with the work, means for periodically reciprocating the slide to effect separation of the tool and work and their reengagement again, and means for indexing the indexable member on each separation.

4. In a machine for grinding gears, a bed, a slide reciprocable on the bed, a tool support and a work support, one of which is mounted on the slide and the other of which is mounted on the bed, a tool mounted on the tool support, means for producing movements between the tool and work to effect tooth-forming operations, an indexable plate and a stop-member cooperating therewith, one of which is mounted on the bed and the other of which is mounted on the slide, said indexable plate having a plurality of lands of progressively varying height which are engageable progressively with the stop-member, on indexing of the plate, to determine the depth of engagement of the tool with the work, dressing mechanism, a motor for actuating said dressing mechanism, means for periodically reciprocating the slide to effect separation of the tool and work and their reengagement again, means for indexing the plate on each separation, and spaced members carried by the plate which are operative on predetermined indexes of the plate to start said motor to effect dressing of the grinding wheel.

5. In a machine for producing gears, a work support, a work spindle journaled in the work support, a tool support, a tool mounted on the tool support, a carrier on which one of said supports is mounted, means for actuating the tool, means for moving the carrier alternately in opposite directions, means for rotating the work spindle in time with the forward movement of the carrier to generate the tooth profiles, means for effecting relative movement between the carrier and the work spindle on the return movement of the carrier to index the work spindle, and means operative periodically during return movements of the carrier to increase the depth of engagement of the tool and work.

6. In a machine for producing gears, a work support, a work spindle journaled in the work support, a tool support, a grinding wheel journaled in the tool support, a carrier on which one of said supports is mounted, means for driving the wheel, means for moving the carrier alternately in opposite directions, means for rotating the work spindle in time with the forward movement of the carrier to generate the tooth profiles, means for effecting relative movement between the carrier and the work spindle on the return movement of the carrier to index the work spindle, dressing mechanism, means controlling the depth of engagement of wheel and work during generation, means operative periodically during return movements of the carrier to stop the movements of the carrier and work spindle, to actuate said control means to increase the depth of engagement of wheel and work, and to actuate the dressing mechanism to dress the wheel, and means operative automatically to restart the carrier and work spindle movements after the dressing mechanism has been actuated.

7. In a machine for grinding gears, the combination with a grinding wheel and a work support, and means for effecting relative rolling movements between the wheel and work support to generate the tooth profiles of the work, of means for increasing the depth of engagement of wheel and work after a grinding operation has been performed on each tooth of the work so that the teeth may be ground to greater depth, dressing mechanism, and means operative periodically on actuation of the last-named means for actuating the dressing mechanism to dress the wheel.

8. In a machine for grinding gears, a work support, a work spindle journaled in the work support, a tool support, a grinding wheel journaled in the tool support, an oscillatable cradle on which one of the supports is mounted, means for rotating the wheel, means for rotating the work spindle, means for effecting forward and return translatory movements of the cradle, said forward movements being timed to the work spindle rotation whereby to effect generating roll of wheel and work, means for periodically stopping the return movements of the cradle and the work spindle rotation, means for dressing the grinding wheel during said periodic stoppages, and means for automatically restarting the translatory movements and the work spindle rotation again after the wheel has been dressed.

9. In a machine for producing gears, a work support, a work spindle journaled in the work support, a tool support, a tool mounted thereon, a carrier on which one of said supports is mounted, means for actuating the tool, means for moving the carrier alternately in opposite directions, means for rotating the work spindle with the forward movements of the carrier to generate the tooth profiles and for effecting relative movement between the carrier and work spindle on the return movements of the carrier to index the work spindle, and means for applying a light brake load to the carrier during its forward movements and for releasing said load during the return movements of the carrier.

10. In a machine for grinding gears, a work support, a work spindle journaled in the work support, a tool support, a grinding wheel journaled therein, a carrier on which one of said supports is mounted, means for actuating the tool, means for moving the carrier alternately in opposite directions, means for moving the wheel in opposite directions to engage the work during forward movements of the carrier and to be out of engagement with the work during return movements of the carrier, means for rotating the work spindle in time with the forward movements of the carrier to generate the tooth profiles and for effecting relative movement between the carrier and work spindle on the return movements of the carrier to index the work spindle, dressing mechanism, means for periodically actuating the dressing mechanism, and means for preventing actuation of the dressing mechanism unless the wheel is in its withdrawn position.

11. In a machine for grinding gears, a work support, a tool support, a grinding wheel journaled in the tool support, an oscillatable cradle on which one of said supports is mounted, means for rotating the wheel, means for oscillating the cradle, means for rotating the work support on its axis in time with the cradle motion during swing of the cradle in one direction to generate the tooth profiles and for effecting relative movement between the work support and cradle during swing of the cradle in the opposite direction to effect indexing of the work, means operable periodically to vary the depth of engagement of the wheel and work after a predetermined number of tooth-grinding operations, and means operable on predetermined such periods to advance the grinding wheel axially and to dress the wheel.

12. In a machine for producing gears, a work support, a tool support, a tool mounted on the tool support, a carrier on which one of said supports is mounted, means for actuating the tool, means for moving the carrier alternately in opposite directions, means for rotating the work spindle in time with carrier movement during movement of the carrier in one direction to effect generation of the tooth profiles, means for effecting relative movement of the tool toward and from the work at opposite ends of the carrier movement, and means controlled by the last named means for applying a brake-load to the carrier.

13. In a machine for producing gears, a work support, a tool support, a tool mounted thereon, means for producing relative movements between the tool and work to effect tooth-forming operations, means operable periodically to separate the tool and work and to reengage them, and means operable during the periods of separation to effect step-by-step feed of the work into the wheel, means for causing the work support to be moved to and from loading position, and means operable on movement of the work support to loading position to reset the depth-controlling means.

14. In a machine for grinding gears, a work support, a tool support, a grinding wheel journaled in the tool support, means for producing relative movements between the wheel and work to effect tooth-forming operations, means operable periodically to increase the depth of engagement of the wheel and work, mechanism for dressing the grinding wheel, and means operable by the last-named means for controlling the rate of dressing of the grinding wheel.

15. In a machine for grinding gears, a work support, a tool support, a grinding wheel journaled in the tool support, means for producing relative movements between the wheel and work to effect tooth-forming operations, means operable periodically to increase the depth of engagement of the wheel and work, mechanism for dressing the grinding wheel, and means operable by the last-named means for actuating the dressing mechanism periodically.

16. In a machine for grinding gears, a work support, a tool support, a grinding wheel journaled in the tool support, means for producing relative movements between the wheel and work to effect tooth-forming operations, means operable periodically to increase the depth of engagement of the wheel and work, fluid-pressure operated mechanism for dressing the grinding wheel, a plurality of throttle valves which are separately adjustable to control the rate of dressing, a shiftable selector valve for controlling which throttle valve is to control a given dressing operation, and means operable by the depth-increasing means for actuating the dressing mechanism and for controlling the selector valve.

17. In a gear grinding machine, a work support, a tool support, a grinding wheel journaled in the tool support, means for producing relative movements between the wheel and work to effect tooth-forming operations, dressing mechanism, means for moving the dressing mechanism into and out of operative relation with the grinding wheel, means for actuating the dressing mechanism, means for intermittently stopping the tooth-forming operations and for actuating the two means controlling the dressing mechanism, and means for thereafter restarting the tooth-forming operations and stopping the dressing mechanism and returning the dressing mechanism to inoperative position.

18. In a machine for producing gears, a work support, a tool support, a tool mounted thereon, means for actuating the tool, means for producing relative rolling movements between the tool and work support to generate the tooth profiles, a member provided with a plurality of steps that are progressively of varying height, the step which is in operative position during any rolling movement controlling the depth of engagement in the direction of tooth height of tool and work during the rolling movement, means for periodically separating the tool and work supports, and means operable on each such separation to move the depth-controlling member one step.

19. In a machine for producing gears, a work support, a tool support, a tool mounted thereon, means for actuating the tool, means for producing relative rolling movements between the tool and work support to generate the tooth profiles, a member provided with a plurality of steps that are progressively of varying height, the step which is in operative position during any rolling movement controlling the depth of engagement in the direction of tooth height of the tool and work during the rolling movement, means for separating the work and tool supports after an operation on each tooth of the work by the tool, and means for automatically moving the depth-control member one step on each separation.

20. In a machine for grinding gears, a work support, a tool support, a grinding wheel rotatably mounted on the tool support, means for effecting the operating cycles of the machine comprising relative feed of the wheel into the work, relative roll of wheel and work to generate a tooth profile, relative withdrawal of the wheel from the work, and relative movement of the wheel and work to index the work, means operable automatically after the machine has performed as many operating cycles as there are teeth to be ground to cause the work to be engaged at greater depth with the wheel, mechanism for dressing the wheel, and means operable automatically after a predetermined number of operations of the last-named means to stop the working cycles of the machine and to actuate the dressing mechanism, and means for automatically restarting the operating cycles again after the dressing mechanism is in operation.

21. In a machine for producing gears, a work support, a tool support, a grinding wheel journaled in the tool support, means for rotating the grinding wheel, means for producing relative movements between the wheel and the work to effect tooth-forming operations, a member adapted to be advanced step-by-step periodically for controlling the depth of engagement of the wheel with the work, means for dressing the grinding wheel, means controlled by said member in its movement for actuating said dressing means at predetermined intervals, and means controlled by said member in its movement for determining the rate of each dressing operation.

22. In a machine for producing gears, a bed, a slide reciprocable on the bed, a work support and a tool support, one of which is mounted on the slide, a grinding wheel journaled in the tool support, means for rotating the grinding wheel, means for producing relative movements between the wheel and work to effect tooth-forming operations, an indexable member and a stop member cooperating therewith, one of which is mounted on the bed and the other of which is mounted on the slide, said indexable member having a plurality of lands arranged step-wise which are engageable progressively with the stop member, on indexing of the indexable member, to determine the depth of engagement of the wheel with the work, means for indexing the indexable member periodically, a dressing mechanism for the grinding wheel, and a plurality of members adapted to be mounted on the indexable member and to be spaced at adjustable distances from one another to actuate the dressing mechanism on predetermined indexes of the indexable member.

23. In a machine for producing gears, a bed, a slide reciprocable on the bed, a work support and a tool support, one of which is mounted on the slide, a grinding wheel journaled in the tool support, means for rotating the grinding wheel, means for producing relative movements between the wheel and work to effect tooth-forming operations, an indexable member and a stop member cooperating therewith, one of which is mounted on the bed and the other of which is mounted on the slide, said indexable member having a plurality of lands arranged step-wise which are engageable progessively with the stop member, on indexing of the indexable member, to determine the depth of engagement of the wheel with the work, means for indexing the indexable member periodically, dressing mechanism for the grinding wheel, a motor for actuating the dressing mechanism, a limit switch for controlling the operation of said motor, a plurality of buttons carried by the indexable member and mounted thereon for adjustment to varying distances apart, each of said buttons being adapted, when moved into engagement with said limit switch on indexing of the indexable member, to close said limit switch to actuate said motor.

24. In a machine for producing gears, a bed, a slide reciprocable on the bed, a work support and a total support, one of which is mounted on the slide, a grinding wheel journaled in the tool support, means for rotating the grinding wheel, means for producing relative movement between the wheel and work to effect tooth-forming operations, an indexable member and a stop member cooperating therewith, one of which is mounted on the bed and the other of which is mounted on the slide, said indexable member having a plurality of lands arranged step-wise which are engageable progressively with the stop member, on indexing of the indexable member, to determine the depth of engagement of the wheel with the work, means for indexing the indexable member periodically, dressing mechanism for the grinding wheel, a motor for actuating the dressing mechanism, a limit switch for controlling the operation of the motor, a plurality of buttons carried by the indexable member and adjustable thereon to varying distances apart, each of said buttons being adapted to close said limit switch to start the motor when the button is engaged with the limit switch in the indexing of the indexable member, separate means for selecting the rate of operation of the dressing mechanism to effect selectively either rough dressing or finish dressing and operated by said limit switch, said selecting means being so constructed that when the indexable member stops with one of said buttons in engagement with the limit switch, the dressing mechanism is actuated at a slow rate to effect finish dressing, while when one of the buttons merely passes over the limit switch and clears the same again, in the indexing of the indexable member, the dressing mechanism is actuated at a fast rate to effect rough dressing.

CLARENCE T. GALLOWAY.